(12) United States Patent
Nakao et al.

(10) Patent No.: US 6,724,521 B2
(45) Date of Patent: Apr. 20, 2004

(54) ELECTROPHORESIS DISPLAY DEVICE

(75) Inventors: Hideyuki Nakao, Kanagawa-ken (JP); Teruo Murakami, Kanagawa-ken (JP); Sadao Kajiura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/101,977

(22) Filed: Mar. 21, 2002

(65) Prior Publication Data

US 2002/0135861 A1 Sep. 26, 2002

(30) Foreign Application Priority Data

Mar. 21, 2001 (JP) .................................. 2001-079980
Oct. 15, 2001 (JP) .................................. 2001-316760

(51) Int. Cl.$^7$ ........................... G02B 26/00; G09G 3/36
(52) U.S. Cl. ..................... 359/296; 359/290; 359/295; 345/107
(58) Field of Search ................. 359/296, 290, 359/238, 295, 292, 291; 345/107

(56) References Cited

U.S. PATENT DOCUMENTS

| 5,223,823 | A | * | 6/1993 | Disanto et al. | ............. | 340/787 |
| 6,239,896 | B1 | * | 5/2001 | Ikeda | ............. | 359/240 |
| 6,323,989 | B1 | * | 11/2001 | Jacobson et al. | ............. | 359/296 |

OTHER PUBLICATIONS

Proceeding of the S.I.D., vol. 18/3 & 4, B. Singer et al., "An X–Y Addressable Electrophoretic Display," 1977, pp. 255–266.

SID 00 Digest, E. Kishl et al., "Development of In–Plane EPD," 2000, pp. 24–27.

* cited by examiner

Primary Examiner—Georgia Epps
Assistant Examiner—Timothy Thompson
(74) Attorney, Agent, or Firm—Oblon, Spivak, McClelland, Maier & Neustadt, P.C.

(57) ABSTRACT

Electrophoresis display devices using charged particles which move in each cell in accordance with the electrophoresis caused by electrodes neighboring the cell. First through third electrodes are used to provide the electrophoresis to the charged particles in a dispersion liquid of each cell. The first and the second electrodes are formed in parallel with each other on a side of a first board and the third electrode is formed on a second board 5 to intersect with the first and the second electrodes. The first electrode may be applied with an initial voltage, a first hold voltage and a rewriting voltage between the initial voltage and the first hold voltage in an order of the first voltage, the rewriting voltage and the first hold voltage. The second electrode may be applied with intermediary voltage between the initial voltage and the rewriting voltage to the first electrode. The third electrode may be applied with a color display voltage different from the intermediary voltage and second holds voltage in synchronism with the first hold voltage. The dispersion liquid may be sealed by a microcapsule or the like and a position of the microcapsule may be fixed by a projection formed on one of the boards.

35 Claims, 22 Drawing Sheets

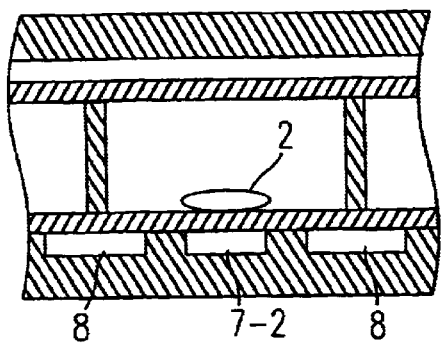
FIG. 4A
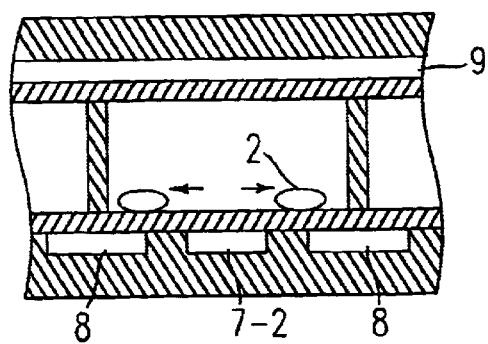
FIG. 4B1
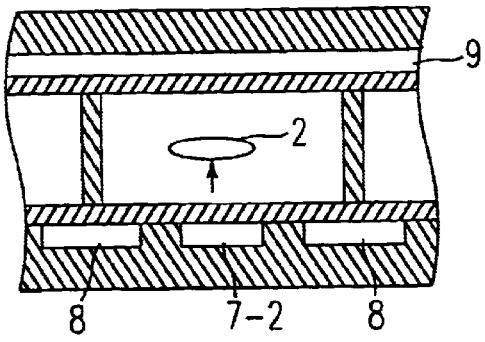
FIG. 4B2
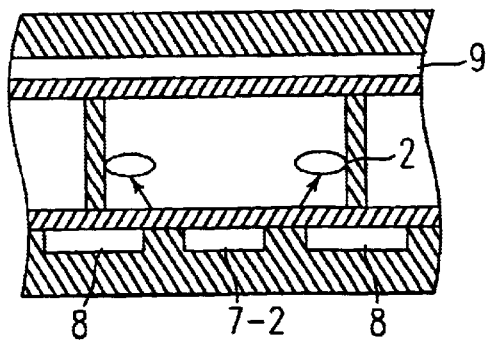
FIG. 4C1
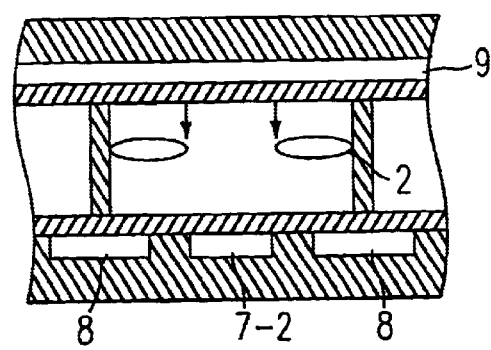
FIG. 4C2

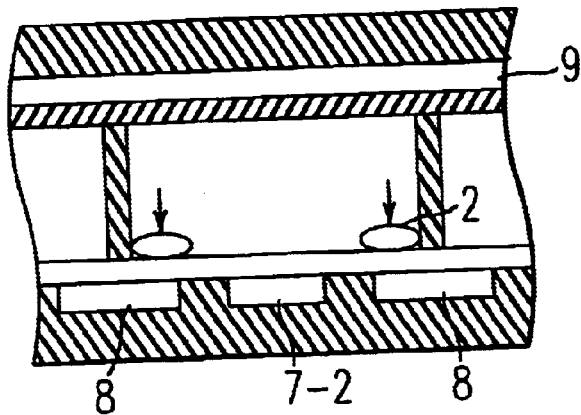
FIG. 4D1
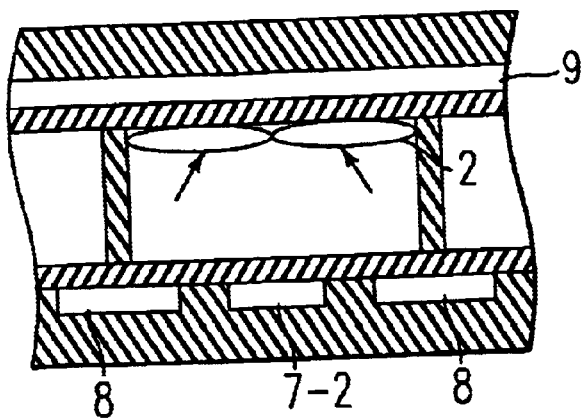
FIG. 4D2

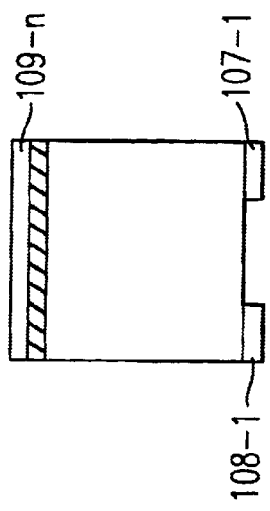
FIG.22A
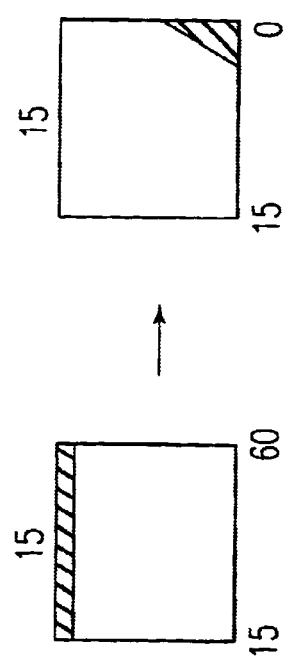
FIG.22B1  FIG.22B2  FIG.22B3  FIG.22B4
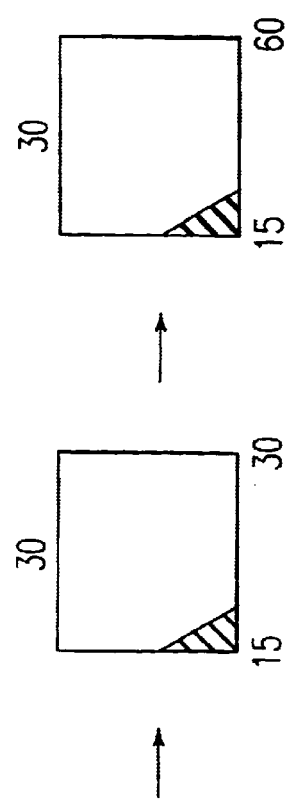
FIG.22C1  FIG.22C2  FIG.22C3  FIG.22C4

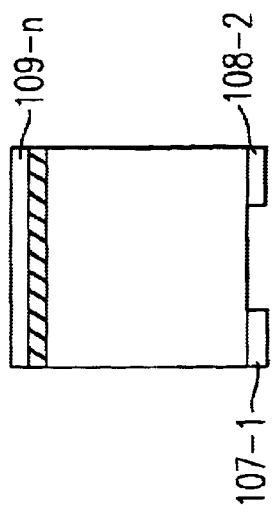
FIG.23A
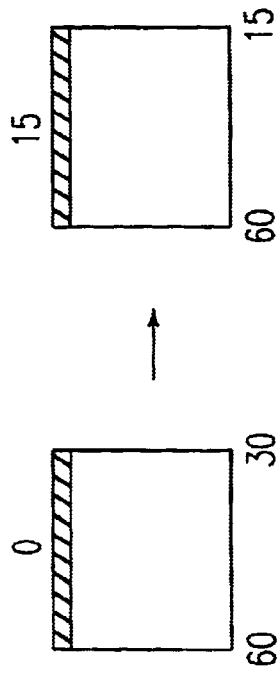
FIG.23B1  FIG.23B2  FIG.23B3  FIG.23B4
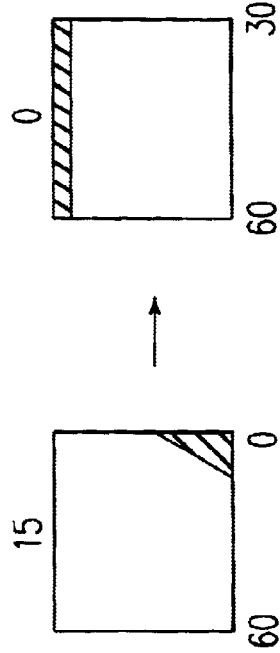
FIG.23C1  FIG.23C2  FIG.23C3  FIG.23C4

ELECTROPHORESIS DISPLAY DEVICE

CROSS-REFERENCE TO RELATED APPLICATIONS

This application claims the benefit of priority from Japanese Patent Applications Nos. 2001-079980, filed on Mar. 21, 2001, and 2001-316760, filed on Oct. 15, 2001, the entire contents of which are incorporated herein by reference.

BACKGROUND OF THE PRESENT INVENTION

1. Field of the Invention

The present invention relates to an electrophoresis display device using a dispersion liquid which comprises a plurality of electrophoresis particles dispersed in an insulating liquid.

2. Discussion of the Background

There is an expectation for a reflective display device for its low power consumption and to not be a burden on the eyes of a viewer. For example, an electrophoresis display device as described in U.S. Pat. No. 3,668,106 is a known reflective display device.

The electrophoresis display device includes a dispersion liquid or fluid and a pair of electrodes opposed to each other by interposing the dispersion liquid. The dispersion liquid includes an insulating liquid and electrophoresis particles possessing an electric charge dispersed in the insulating liquid. The electrophoresis particles are moved onto one of the pair of electrodes having an electric polarity opposite that of the electrophoresis particles by an applied electric field to the dispersion liquid via the electrodes, whereby a successive image is displayed. A background color which is contrastive to the electrophoresis particle is carried by the insulating liquid including pigment particles.

When the electrophoresis particles are adhered to a surface of the electrode near to an observational surface, the electrophoresis display device displays the color of the electrophoresis particles. Further, when the electrophoresis particles are adhered to a surface of an electrode remote from the observational surface, the color carried by the electrophoresis particles is concealed by the insulating liquid and the electrophoresis display device displays the color of the insulating liquid.

The electrophoresis display device has several advantages, such as a wide viewing angle, a high contrast and a low power consumption as described in, for example, Proc. SID. 18, 267 (1977). On the other hand, a simple matrix drive cannot be performed because it is difficult to provide a threshold characteristic between an applied voltage and display color property. Therefore, the electrode for each pixel needs to be provided with a switching element. However, the required applied voltage to the electrode is high, and therefore the thin film transistor technology used in a liquid crystal display is difficult to apply to the display device. Thus, a circuit of a switching element for the respective electrodes has to be formed on a board separate from the display panel. Further, the display panel and the board need to be connected by a plurality of wirings. Therefore, the larger the number of pixels, the larger the number of wirings and the device cannot be realized.

With regard to the structural problem of the electrophoresis display device, there are also examples enabling the simple matrix drive by employing devised structures, as described in Proc. SID. 18, 255 (1977) or SID 00 DIGEST, 24 (2000), Another electrophoresis display device capable of performing the simple matrix drive is also described in Japanese Patent Laid-Open No. 2001-201770. This electrophoresis display device includes a structure holding an insulating liquid dispersed with electrophoresis particles between a first board having three types of electrodes and a second board having one type of electrode.

To attain a high resolution electrophoresis display device, a simple matrix structure is appreciated. However, according to the conventional technology, the simple matrix drive increases the cost of the display device because of its complicated structure.

The complicated cell structure, such as the device described in Proc. SID, 18, 255 (1977) or SID 00 DIGEST, 24 (2000), increases a cost of the display device and hampers high resolution formation. The device also includes a partition wall for providing a control electrode in the cell, and when the pixel size of display device for high resolution is downsized, there is a limit in thin film formation for the partition wall. Thus, a deterioration in the display characteristic is estimated because of the smaller aperture rate of each pixel.

SUMMARY OF THE PRESENT INVENTION

An object of the present invention is to provide an electrophoresis display device which can attain a simple matrix drive with a simple structure.

To achieve these and other objects, the present invention provides an electrophoresis display device including a first board having a first surface, first electrodes disposed on the first surface, second electrodes disposed on the first surface in parallel with the first electrodes. Also included is a second board having a second surface facing the first surface, and third electrodes disposed on the second surface. Further, each of the third electrodes intersects with the first and second electrodes. The device further includes a dispersion liquid disposed between the first and the second boards and including an insulating liquid and a plurality of electrophoresis particles charged to a same electrical polarity. A first electrical potential supplying unit is also coupled to the first electrode and applies to the first electrode an initial voltage, a first hold voltage, and a rewriting voltage having a voltage value between the initial voltage and the first hold voltage. The first electrical potential supplying unit applies the intital, first hold and rewriting voltages in an order of the initial voltage, the rewriting voltage and the first hold voltage. Also included is a second electrical potential supplying unit coupled to the second electrode and configured to apply to the second electrode an intermediary voltage having a voltage value between the initial voltage and the rewriting voltage, and a third electrical potential supplying unit coupled to the third electrode and configured to apply to the third electrode a color display voltage or an image signal voltage having a voltage value different from the intermediary voltage, and a second hold voltage having a voltage value between the initial voltage and the rewriting voltage in synchronism with the first hold voltage.

BRIEF DESCRIPTION OF THE DRAWINGS

A more complete appreciation of the present invention and many of the attendant advantages thereof is readily obtained as the state becomes better understood by reference to the following detailed description when considered in connection with the accompanying drawings, wherein:

FIGS. 4A, 4B1, 4B2, 4C1, 4C2, 4D1 and 4D2 are cross-sectional views of part of the cell series for explaining a movement of electrophoresis particles in accordance with a Coulomb force applied to the electrophoresis particles by applied voltages;

FIGS. 22A, 22B1, 22B2, 22B3, 22B4, 22C1, 22C2, 22C3 and 22C4 are cross-sectional views for explaining a movement of electrophoresis particles during a rewrite of a cell at one cell series according to the eighth embodiment of the present invention;

FIGS. 23A, 23B1, 23B2, 23B3, 23B4, 23C1, 23C2, 23C3 and 23C4 are cross-sectional views for explaining a movement of electrophoresis particles during a rewrite of a cell of other cell series according to the eighth embodiment of the present invention;

DESCRIPTION OF THE PREFERRED EMBODIMENTS

Figure 1:
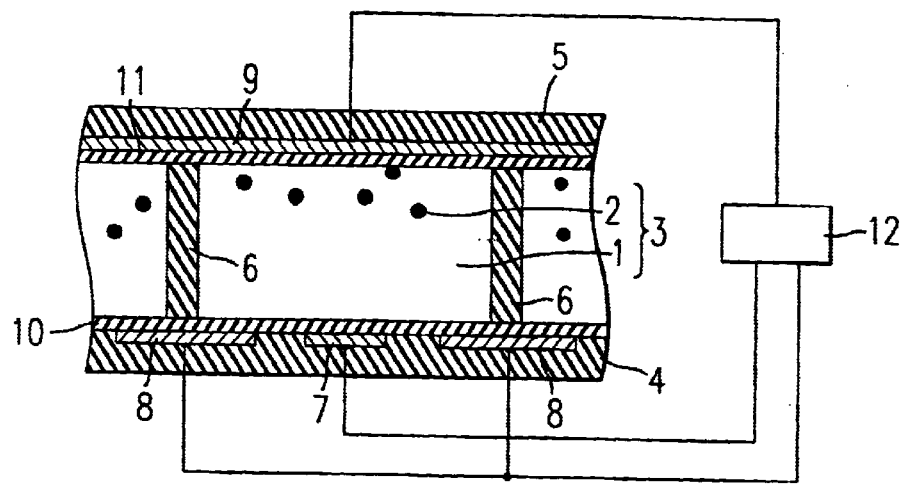
FIG. 1 is a cross-sectional view of part of a cell series accompanied with a power source unit coupled to respective electrodes disposed near the cell series of an electrophoresis display device according to a first embodiment of a present invention.

Referring now to the drawings, wherein like reference numerals designate identical or corresponding parts throughout the several views, the present invention will be described.

FIG. 1 is a cross-sectional view of part of a cell series of an electrophoresis display device according to a first embodiment of the present invention. FIG. 1 also illustrates the connection between respective electrodes and a power source unit 12 of the electrophoresis display device.

The cell series of the electrophoresis display device of the first embodiment includes a plurality of cells aligned in one direction. Each of the plurality of cells includes a dispersion liquid 3 having a colorless transparent insulating liquid 1 and a plurality of electrophoresis particles 2 of same electrical polarity. The electrophoresis particles 2 in each cell carry a single color, for example black. The dispersion liquid 3 is held in an area surrounded by a first board 4, a transparent second board 5 formed on a side of an observational surface of the electrophoresis display device, and a third board 6 disposed between the first and the second boards 4 and 5.

In addition, first and second electrodes 7 and 8 are formed on a dispersion liquid side surface of the first board 4. As shown, the first electrode 7 is formed substantially at a center of the dispersion liquid held area and the second electrode 8 is aligned with each corner of the dispersion liquid held area.

A third electrode 9, which is transparent, is also formed on a dispersion liquid side surface of the second board 5 and intersects with the first and the second electrodes 7 and 8.

Further, a dielectric layer 10 covers surfaces of the first and the second electrodes 7 and 8, and a dielectric layer 11 covers a surface of the third electrode 9, thus separating the first through the third electrodes 7, 8 and 9 from the dispersion liquid 3. There are several ways to provide a contrastive color of the electrophoresis particles 2 to each cell. Further, in this embodiment, the dielectric layer 10 is provided with a contrastive color, for example white.

The first, second and third electrodes 7, 8 and 9 are coupled to a power source unit 12, which controls a polarity and values of respective voltages applied to the first, second and third electrodes 7, 8 and 9. In addition, the power source unit 12 may also have separate power source units corresponding to respective electrodes. Each of the power source units may be placed separately on a board of the electrophoresis display device. The power source unit may also be formed on the board 4 with the plurality of cells, or may be formed on a board separate from the plurality of cells.

Figure 2:
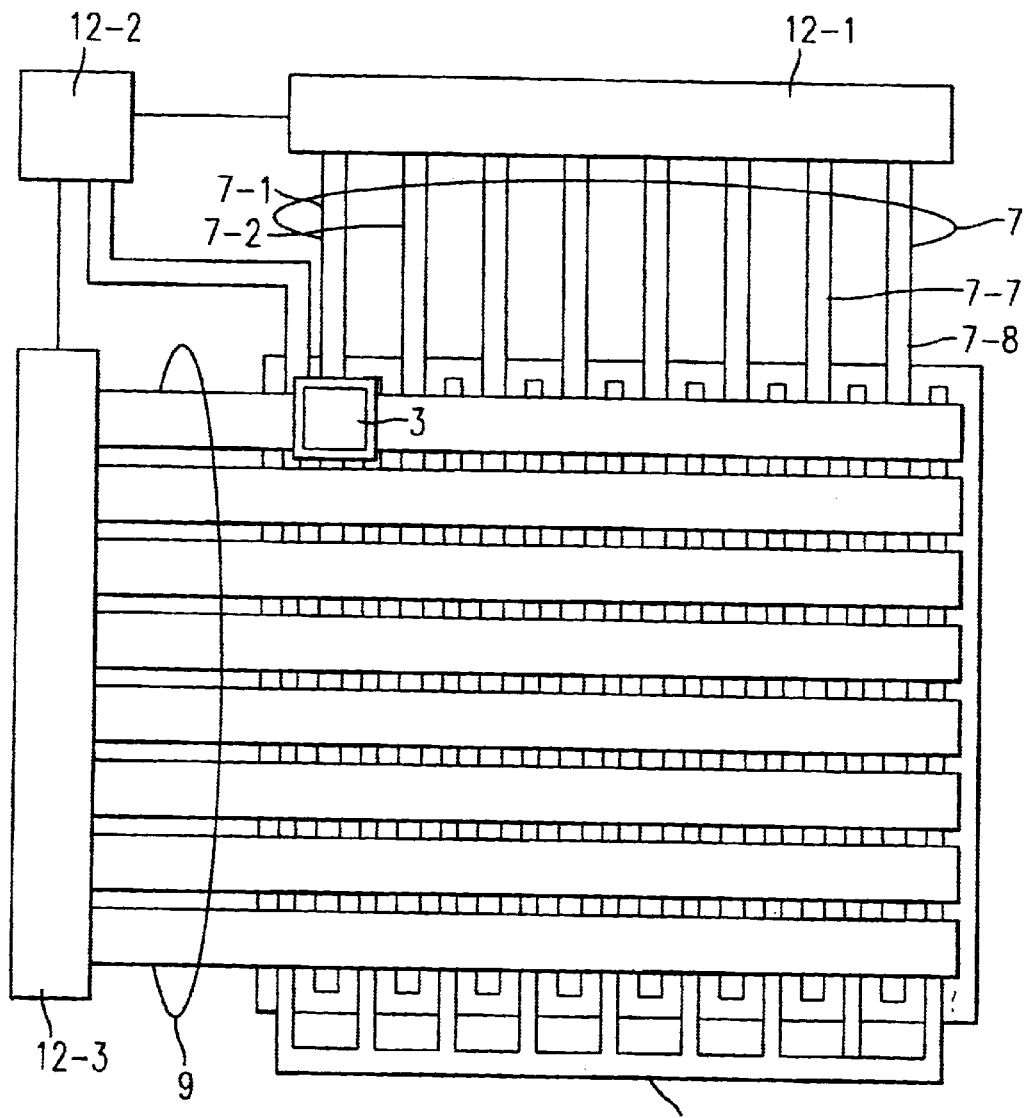
FIG. 2 is a plan view of a cell area including several cell series and electrodes coupled to respective first through third power source units according to the electrophoresis display device of the first embodiment of the present invention.

Turning now to FIG. 2, which is a plan view of the electrophoresis display device including a plurality of cell series aligned in row and column directions.

The electrophoresis display device of the first embodiment has a plurality of third electrodes 9, each having a strip-shape extending in a row direction of FIG. 2, and a plurality of first electrodes 7 and a plurality of second electrodes 8, each having a strip-shape extending in a column direction of FIG. 2. Although the first and the second electrodes 7 and 8 of FIG. 2 are orthogonal to the third electrode 9, angles formed between the electrodes formed on different boards may be changed so as to intersect with each other. Further, a square region of FIG. 2 surrounded by a bold square corresponds to one cell (pixel) and the dispersion liquid 3 is filled in the square region as well as other cells.

The electrophoresis display device of FIG. 2 has 8×8 pixels so as to provide a simple explanation. Eight of the first electrodes 7 (i.e., 7-1, 7-2, 7-3, 7-4, 7-5, 7-6, 7-7 and 7-8) are applied with an initial voltage, a rewrite voltage or a first hold voltage by a first power source unit 12-1, and second electrodes 8 are coupled to a second power source unit 12-2. Eight of the third electrodes 9 are applied with a rewrite voltage or a hold voltage from a third power source unit 12-3.

In addition, a control circuit mounted on the second power source unit 12-2 controls values and timings of respective voltages supplied to the first, second and third electrodes 7, 8 and 9.

Although there may be several operational examples of the electrophoresis display device, one simple example is as follows.

A rewrite operation of each cell series extending in the row direction can be performed, from the left side of FIG. 2 to the right side of FIG. 2, such as from a first column coupled to the first electrode 7-1, a second column coupled to the second electrode 7-2, a third column coupled to the first electrode 7-3, a fourth column coupled to the first electrode 7-4, a fifth column coupled to the first electrode 7-5, a sixth column coupled to the first electrode 7-6, a seventh column coupled to the first electrode 7-7, and finally an eighth column coupled to the first electrode 7-8.

Figure 3:
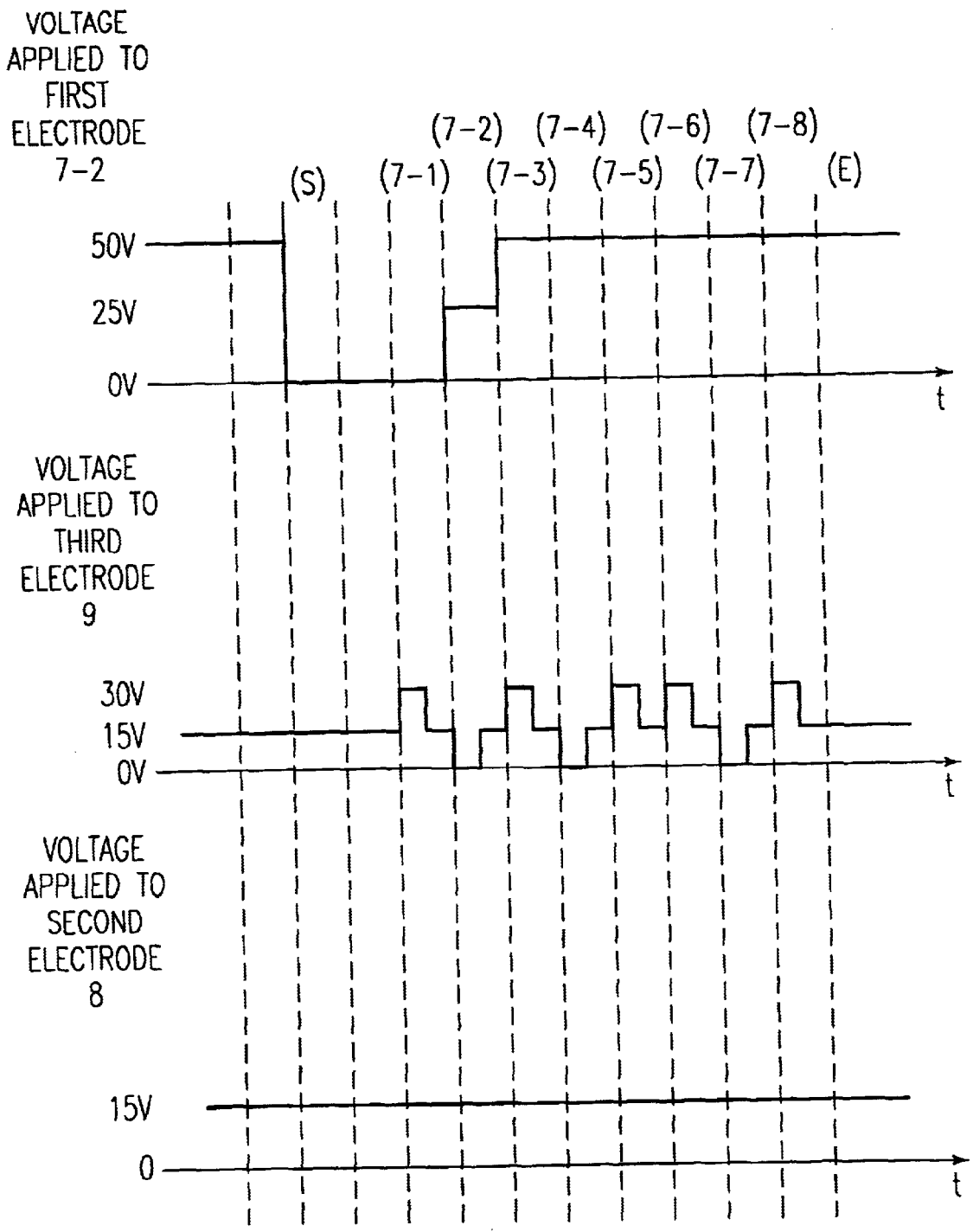
FIG. 3 is a timing diagram illustrating a voltage applying sequence according to the first embodiment of the present invention.

FIG. 3 is a timing diagram illustrating voltages applied to the first, second and third electrodes 7-2, 8 and 9 for rewriting a color of a selected cell at an intersection between the first electrode 7-2 and any of the third electrodes 9.

A timing (S) in FIG. 3 corresponds to an initial rewriting operation, where the plurality of first electrodes 7-1, 7-2, 7-3, 7-4, 7-5, 7-6, 7-7 and 7-8 are applied with 0 V, the third electrode 9 is applied with 15 V and the second electrode 8 is applied with 15 V, whereby the positively charged electrophoresis particles 2 gather on the first electrode 7 having the lowest electrical voltage.

Then, each cell of the selected sell series will be rewritten by controlling the voltages applied to the electrodes 7-n, 8 and 9.

Each of the timings (7-1), (7-2), (7-3), (7-4), (7-5), (7-6), (7-7) and (7-8) in FIG. 3 corresponds to a write timing of selected row's 8 cells coupled to the eight first electrodes 7-1, 7-2, 7-3, 7-4, 7-5, 7-6, 7-7 and 7-8.

Before rewriting the corresponding cell, the voltage applied to the electrode 7-2 is maintained as 0 V at timing (7-1) of FIG. 3, and the positively charged electrophoresis particles 2 are held on the side of the first electrode 7-2.

In addition, the electrical potential of the first electrode 7-2 is increased to 25 V at the cell's rewrite timing, as timing (7-2). The electrical potential of the third electrode 9 is dropped to 0 V at timing (7-2) and the electrophoresis particles 2 gather to the side of the third electrode 9, resulting in the cell displaying the color of the electrophoresis particles 2. The electrical potential of the third electrode 9 is alternatively increased to 30 V which pushes away the electrophoresis particles 2 to the side of the second electrode 8, resulting in the cell displaying the color of dielectric layer 10. Because the image of the display changes in accordance with the change of the color of each cell, these color voltage may be referred as image signal voltages.

After a substantial time period has passed from the change of voltages to the third electrode and the movement of the substantial part of electrophoresis particles 2 finishes, the potential of the first electrode 7-2 is increased to 50 V at timing (7-3) and is maintained through the other cells'rewrite.

As shown, the voltage of the third electrode 9 is varied between 0 V and 30 V for controlling cells of other columns. There are time periods during which a middle voltage, such as 15 V, is applied to the third electrode 9 for rewriting the cells of other rows. In this embodiment, each time period maintaining the third electrode 9 to 0 V, 15 V or 30 V is set for 10 m sec, whereby the electrophoresis particles 2 move a short distance from the rewrite position in accordance with the changes of voltages of the third electrode 9 for other cells during the first time period of 10 msec, but return to the written position in the next time period of 10 msec.

In other words, the electrophoresis particles 2 move back and forth near the rewritten position during the rewrite operation of the other cells, however, the electrophoresis particles 2 return to the rewritten position in the end. As a final rewriting operation of all cells in one row, at timing (E) of FIG. 3, the first electrode 7-2 maintains 50 V, the third electrode is set to 15 V and the second electrode maintains 15 V, for a predetermined time period, such as 100 msec, thereby settling the electrophoresis particle 2 at the rewritten position. Therefore, the electrophoresis particles 2 are kept near the electrode to which the electrophoresis particles 2 had moved, even when the voltages of the electrodes are set to 0V after a rewrite operation, so the cell keeps its color.

Turning now to FIGS. 4A, 4B1, 4B2, 4C1, 4C2, 4D1 and 4D2, which are cross-sectional views for explaining a movement of the electrophoresis particles 2 of the cell rewritten by the above described method during its rewrite operation. The arrows in FIGS. 4B1, 4B2, 4C1, 4C2, 4D1 and 4D2 indicate a Coulomb force exerted to the electrophoresis particles 2.

At an initial stage (S) in FIG. 3, the electrophoresis particles 2 are gathered near the first electrode 7-2 of FIG. 4A. The electrophoresis particles 2 are held near the first electrode 7 until the rewrite timing of the cell occurs.

At the rewrite timing of the cell at timing (7-2) in FIG. 3, the voltage to the first electrode 7-2 increases to 25 V and the electrophoresis particles 2 leave the first electrode 7-2 according to a successive voltage applied to the third electrode 9. If a voltage of 30 V is applied to the third electrode 9, the electrophoresis particles 2 separate into two parts and each part moves toward one of the two second electrodes 8 as shown in FIG. 4B1. In addition, if a voltage of 0 V is applied to the third electrode 9, the electrophoresis particles 2 move toward the third electrode 9 as shown in FIG. 4B2. Further, if the first electrode 7-2 is applied with a voltage of 50 V when the electrophoresis particles are moving, the electrophoresis particles 2 move quickly to the either one of the electrodes 8 and 9.

In addition, the voltage of the first electrode 7-2 of the rewritten cell is maintained at 50 V and the voltage of third electrode 9 changes between 30 V, 15 V and 0 V during the rewrite operation of other cells in the same row. Therefore, the electrophoresis particles 2 in FIGS. 4C1 and 4C2 move back and forth in a small range. However, after the rewrite operation for all cells of the row, the voltage of the third electrode 9 becomes 15 V. Thus, the electrophoresis particles 2 in FIGS. 4D1 and 4D2 return to either one of the desired regions.

Figure 5:
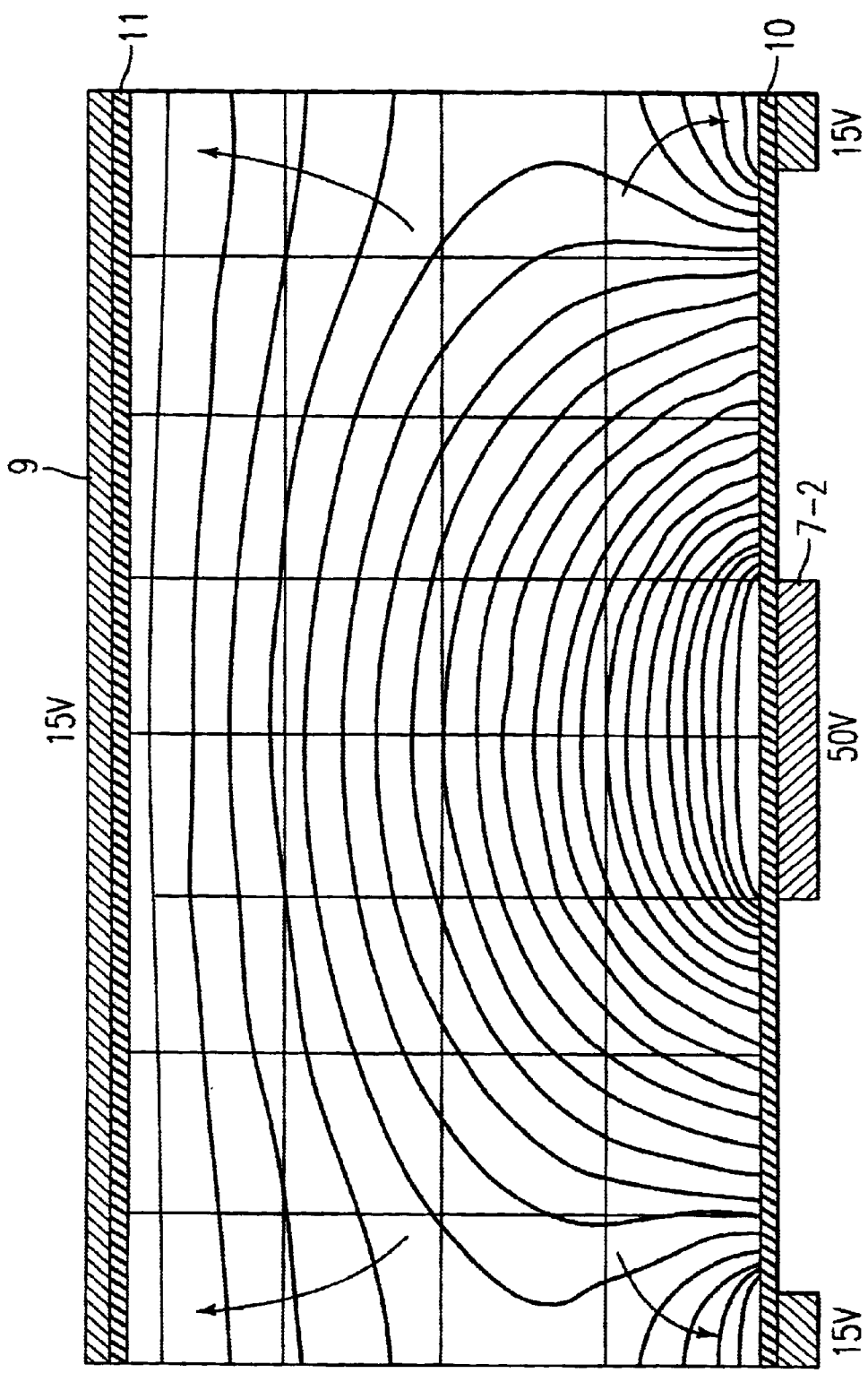
FIG. 5 is a cross-sectional view of a potential distribution in the cell according to the first embodiment of the present invention.

Turning now to FIG. 5, which is a cross-sectional view of a potential distribution in the cell according to the first embodiment of the present invention.

Each line in FIG. 5 represents an equipotential face in the cell when the voltage applied to the first electrode 7-2 is 50 V, the voltage applied to the second electrode 8 is 15 V and the voltage applied to the third electrode 9 is 15 V. Although the electrophoresis particles 2 are more or less moved at both ends of the rewritten cell by a change of the electrical potentials of the third electrode 9, the electrophoresis particles 2 return to either side of the second electrode 8 or the third electrode 9 in accordance with the potential distribution of FIG. 5.

After the rewrite operation of all cells of the selected row, the first and third electrodes 7, 8 and 9 receive the voltages at timing (E) in FIG. 3, electrophoresis particles 2 are held near the third electrode 9 or the second electrodes 8, so as to finish the rewrite operation. When rewritting all the cells in the display device's screen and the electrophoresis particles 2 are reciprocating, the image of the screen may not stabilize and show a dim image, however, the display device is appropriate for a standstill image, such as an advertisement image or an electronic paper.

Further, the electrophoresis particles 2 gathered near the second electrodes 8 may be visible so an observer observes the mixed colors of electrophoresis particles 2 and the dielectric layer 10 depending on the number of the particles 2 in the cell or the size of the cell. Accordingly, shield layers may be applied on a part (corresponding to the second electrode 8) of the second board 5 to shield the electrophoresis particles 2 to prevent the color mixture.

Figure 6:
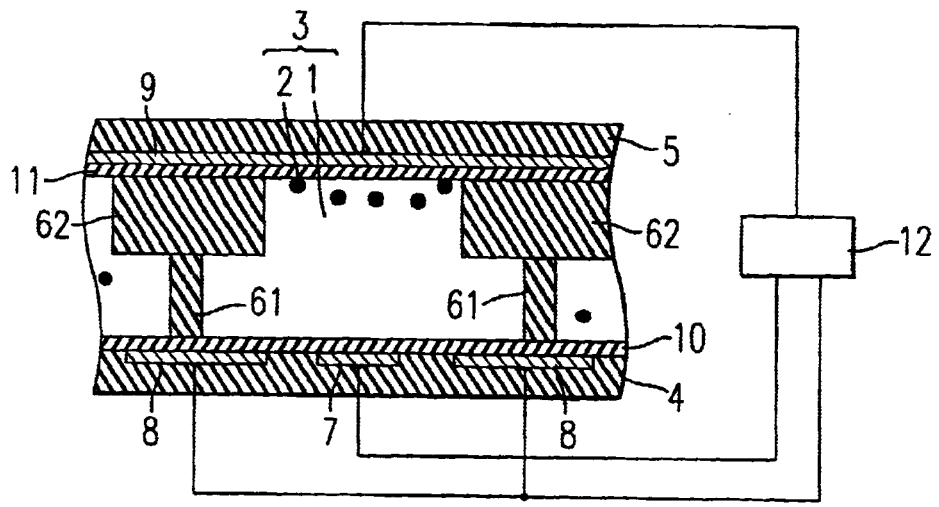
FIG. 6 is a cross-sectional view of part of a cell series accompanied with a power source unit coupled to electrodes for explaining a modified example of the electrophoresis display device according to the first embodiment of the present invention.

The cross-sectional view of the cell surrounded by the first, second and third boards 4, 5 and 6 in FIG. 1 is rectangular by using flat boards as the third boards 6. However, as a modified structure, each of third boards 6 may have two portions 61 and 62 as shown in FIG. 6. The two portions 61 and 62 have different widths and are stacked together, thereby forming a step. As shown, the width of the portion 61 placed near the first board 4 is narrower than the width of the other board 62 and is, for example, about 10 μm. The width of the other board 62 placed near the second board 5 is, for example, about 20 μm.

Figure 7A:
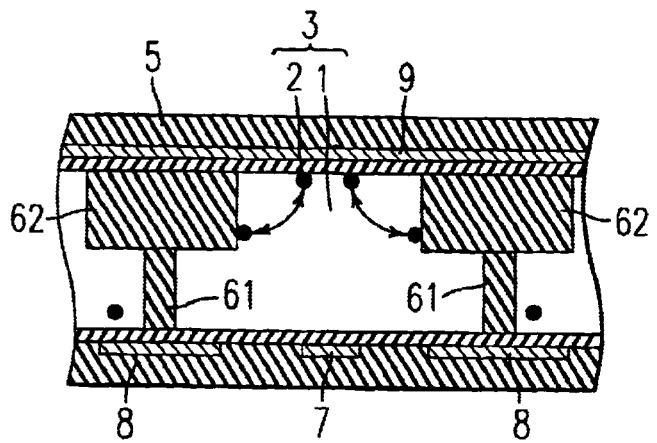
FIGS. 7A and 7B are cross-sectional views of part of a cell series for explaining an advantage of the modified example of FIG. 6.
Figure 7B:
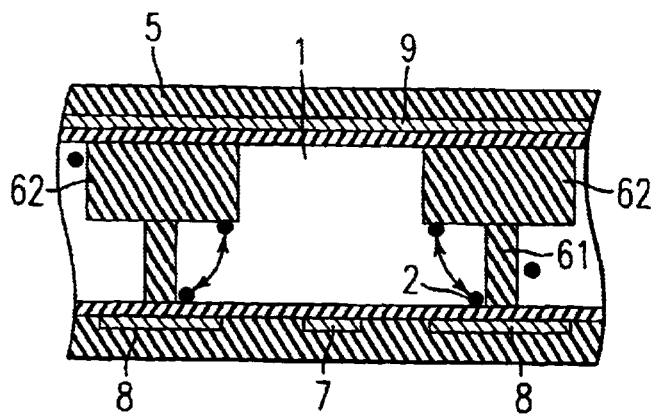

FIGS. 7A and 7B are cross-sectional views of the cell for explaining the movement of the electrophoresis particles 2 of the rewritten cell during the rewrite operation of other cells. The step structures prohibit the electrophoresis particles 2 from moving between the second and the third electrodes 8 and 9 and reaching undesired regions. The electrophoresis particles 2 near the third electrode 9 in FIG. 7A move forward toward the side of the second electrodes 8. However, a side wall of the portions 62 acts as an obstacle and prevents the electrophoresis particles 2 from moving to the second electrode 8.

Further, the electrophoresis particles 2 near the second electrodes 8 in FIG. 7B move forward toward the third electrode 9. However, the lower surface (horizontal surface) of the portions 62 act as an obstacle for preventing the electrophoresis particles 2 from moving to the third electrode 9. The same structure and the same rewrite operation are applicable to the structure of FIG. 6, and the simple matrix display device can also be attained.

Several examples of electrophoresis display device and methods of manufacturing the same are available. One example is as follows.

EXAMPLE 1

Transparent glass boards or plates having a thickness of about 1 mm is used as the first, and the second boards 4 and 5, and a polyimide board having a thickness of about 40 μm is used as the third board 6. A distance between the first and the second boards 4 and 5 is set to about 40 μm, and an interval between the third boards 6 is set to about 80 μm.

The third electrode 9 having a thickness of about 0.1 μm is formed by depositing transparent indium oxide using vapor deposition at a dispersion liquid side surface of the second board 5 and by removing gap regions between the third electrode 9. Aluminum is sputtered on the dispersion liquid side surface of the first board 4 and portions of the aluminum layer are removed by etching, whereby the first and the second electrodes 7 and 8 of aluminum are formed.

The dielectric layers 10 and 11 are arranged to prevent irreversible adhesion of the electrophoresis particles 2 to the first, second and third electrodes 7, 8 and 9. Further, the dielectric layer 10 is arranged to carry the contrastive color of the electrophoresis particle 2. To form the dielectric layer 10 having a thickness of about 0.5 μm, fluororesin containing mixed fine powders of barium sulfate is spin coated on the first board 4. The dielectric layer 11 having a thickness of about 0.5 μm is dip-coated using transparent fluororesin.

The dispersion liquid is prepared as follows. Black resin toner particles 2 having an average particle diameter of 1 μm are used as the electrophoresis particles 2 and an isopropanol is used as the insulating liquid. The black resin toner particles and isopropanol are mixed at a 10% mixture weight of the electrophoresis particles 2 and a small amount of surface reactant is added to promote dispersion stability of the electrophoresis particles 2. The surface of the electrophoresis particles 2 is charged positive as described in the first embodiment. The particles 2 may be charged negative while polarities of voltages applied to the electrodes 4, 5 and 6 during the rewritten operation of FIG. 3 are changed.

The positions of the first and the second electrodes 7 and 8 of the cross-sectional view may be reversed so the first electrode 7 is positioned at the corners of the cell and the second electrode 8 is positioned at the center of the cell. Hereinafter, the same symbols are used to identify the same components as those described in the first embodiment. Accordingly, a detailed explanations of these components should be referred to the description of the first embodiment.

Figure 8:
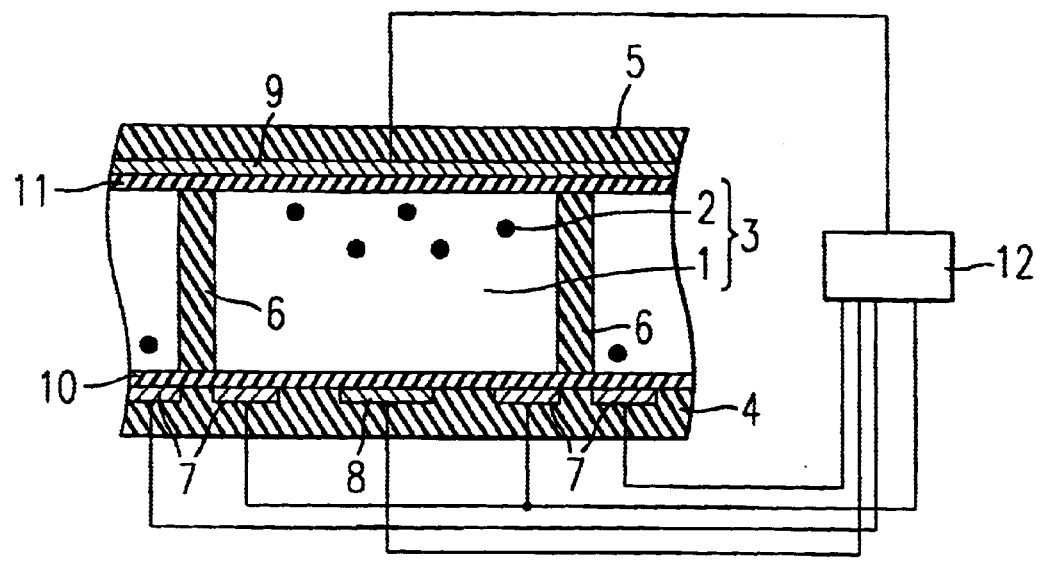
FIG. 8 is a cross-sectional view of part of a cell series accompanied with a power source unit coupled to electrodes of an electrophoresis display device according to a second embodiment of the present invention.

FIG. 8 is a cross-sectional view of part of a cell series accompanied with a power source unit 12 coupled to respective electrodes of an electrophoresis display device according to a second embodiment of the present invention. As shown, the second electrode 8 for collecting the electrophoresis particles 2 is formed at the center of the cell on the first board 4. A pair of the first electrodes 7 for controlling a rewrite and hold operation of the electrophoresis particles 2 is formed at both corners of the cell on the first board 4. For a proper operation, the second electrodes 7 of adjacent two cells cannot be made common or provided with a same voltage and should be divided to correspond to neighbor cells. Further, voltages to respective electrodes by respective power source units can be applied in the same way as described in the first embodiment, and movement of the electrophoresis particles 2 is the same as described in the first embodiment.

Figure 9:
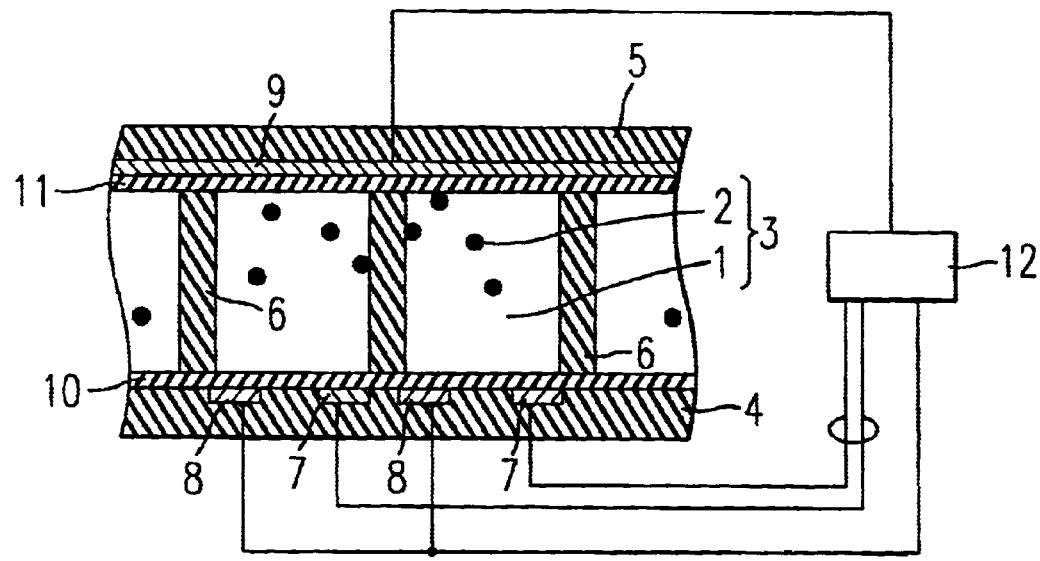
FIG. 9 is a cross-sectional view of part of a cell series accompanied with a power source unit coupled to electrodes of an electrophoresis display device according to a third embodiment of the present invention.

FIG. 9 is a cross-sectional view of part of a cell series accompanied with a power source unit coupled to respective electrodes of an electrophoresis display device according to a third embodiment of the present invention.

Each of the first and second electrodes 7 and 8 in FIG. 9 arranged for one cell is single. Further, voltages to electrodes by respective power source units can be applied in the same way as described in the first embodiment, so the movement of the electrophoresis particles 2 in FIG. 9 is the same as described in the first embodiment.

Further, other equivalents or variations of the cell structures may be selected in view of cell size to attain specific resolution, drive voltage, fabrication cost or other objects. For example, the structure of the third embodiment for promoting high resolution may need an increased numbers of the first electrodes 7 and the second electrodes 8 on one board, resulting in the need for a fabricating method for the electrodes 7 and 8 that provides a fine positional accuracy.

Figure 10:
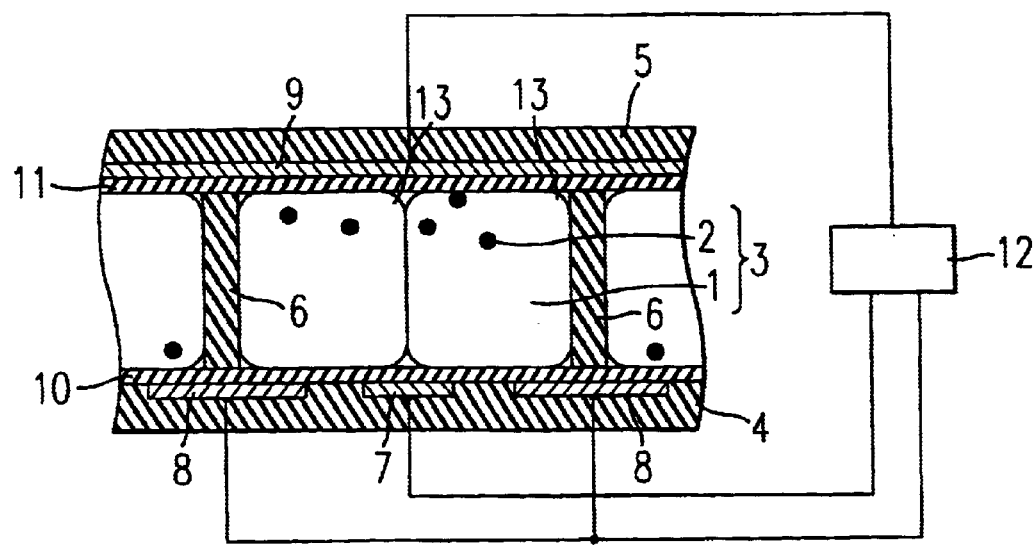
FIG. 10 is a cross-sectional view of part of a cell series using microcapsules accompanied with a power source unit coupled to electrodes of an electrophoresis display device according to a fourth embodiment of the present invention.

Turning now to FIG. 10, which is a cross-sectional view of part of a cell series using microcapsules accompanied with a power source unit coupled to electrodes of an electrophoresis display device according to a fourth embodiment of the present invention.

As shown, the electrophoresis display device of the fourth embodiment in FIG. 10 uses microcapsules 13 each including the dispersion liquid. The microcapsules 13 in FIG. 10 include the dispersion liquid 3 having the electrophoresis particles 2 and the insulating liquid 1, and is formed between the first, second and third boards 4, 5 and 6.

One pixel of the fourth embodiment includes 4 pieces (2×2) of the microcapsules 13. However, the number of the microcapsules of one pixel may be determined based on a preferable resolution of the display device and the size of the microcapsules 13. In the fourth embodiment, the resolution of the display device is 300 dpi and a pitch of one pixel is about 85 $\mu$m. An average size of the microcapsules 13 is 40 $\mu$m.

The microcapsule 13 can be formed using a known coacervation method. For example, 11 weight portions of the dispersion liquid 11 including the electrophoresis particles 2 and the insulating liquid 1 along with 100 weight portions of pure water and 2 weight portions of an emulsifier are first emulsified by a homogenizer. The emulsified mixture solution is then poured into an aqueous solution of 5% geratin-gum arabic at 40° C., and 10% acetic acid is included while stirring, and the mixture is adjusted to pH3.5. Thereafter, the temperature is lowered to 5° C., 37% formalin is poured into the mixture and an aqueous solution of 10% NaOH is added, thereby adjusting the mixture to have pH8.5 and curing the film. The mixture solution is next cleaned by pure water and filtrated by a filter of 1 $\mu$m, thereby forming the microcapsules 13 with an average particle size of 40 $\mu$m incorporated by a transparent polymer film.

As microcapsules forming methods, other than the method explained above, there is an interfacial polymerization method, an insitu polymerization method, an in-liquid curing and coating method, a phase separation method from an organic solution species, a melting, dispersing and cooling method, an in-air suspension method, a spray drying method and so on, which may be selected in accordance with a desired use of the microcapsules.

With regard to the coating shell of the microcapsules 13, other than geratin-gum arabic, condensing species polymer may be used, such as melanine resin, epoxy resin, urea resin, phenolic resin, furan resin or the like, and thermosetting resins, such as crosslinked vinyl terpolymers, for example styrene-divinylbenzene copolymer, methylmethacrylate-vinylacrylate copolymer or the like may be used.

The microcapsules 13 may also be provided with two or more shell layers using two types or more, which are selected from thermosetting resin and thermoplastic resin. To promote thermal stability of the microcapsules 13, it is preferable to use a known thermosetting resin at an outermost shell of the coating. If the material of the shell of the microcapsules 13 is formed to have the functions of the dielectric layers 10 and 11 described above, the dielectric layers 10 and 11 can be omitted.

The electrophoresis display device of the fourth embodiment can also be rewritten by the method using the first, second and third electrodes 7, 8 and 9 described in the first embodiment, and the movement of the electrophoresis particles 2 can be controlled.

Figure 11:
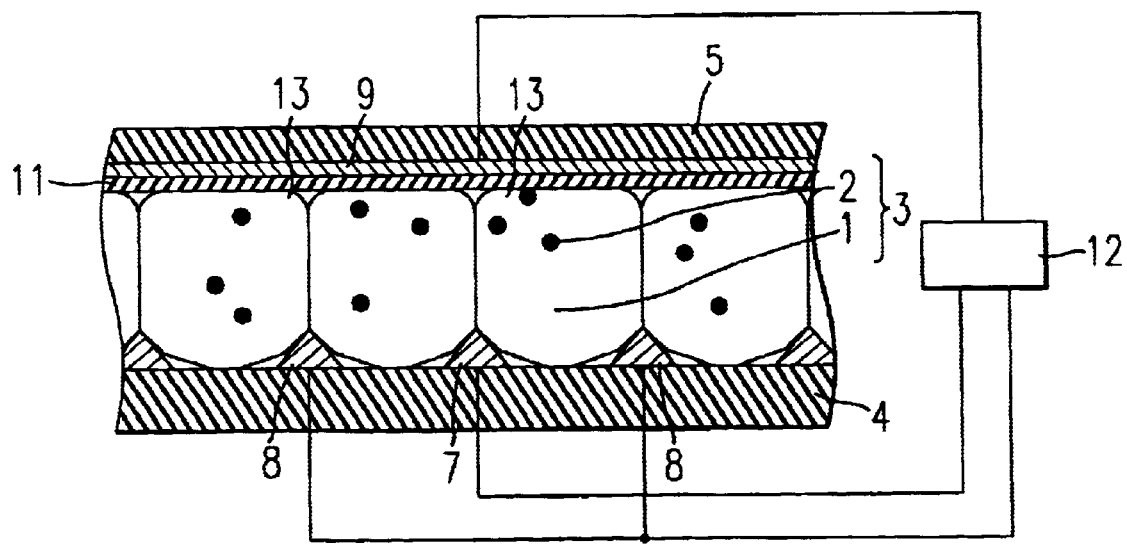
FIG. 11 is a cross-sectional view of part of a cell series using a projection accompanied with a power source unit coupled to electrodes of an electrophoresis display device according to a fifth embodiment of the present invention.

Turning next to FIG. 11, which is a cross-sectional view of part of a cell series using projections accompanied with a power source unit coupled to electrodes of electrophoresis display device according to a fifth embodiment of the present invention.

The third boards 6 between the first and the second boards 4 and 5 for forming each cell area are eliminated in the fifth embodiment, thereby attaining a simpler structure. As shown, the electrophoresis display device of the fifth embodiment has projected electrodes 7 and 8 formed on the first board 4 so as to provide positional alignment of the microcapsules 13. If other structures are used to positionally align the microcapsules 13, the shape of the electrodes 7 and 8 can be flat as described in the previous embodiments.

The first and the second electrodes 7 and 8 have longitudinal directions extending in a direction orthogonal to a paper face of FIG. 11 and have substantially triangular sectional shapes.

The electrodes 7 and 8 can be formed using a printing technology or an etching technology. According to the printing technology, projected electrodes having a height of about 10 $\mu$m through 20 $\mu$m can be formed using conductive ink and screen-printing or photogravure printing technology. The projections can also be formed by etching the conductive layer, for example a copper layer, having a thickness of about 15 μm pasted on the board 4 of FIG. 11. Each of the etched copper electrodes may have a substantially quadrangular shape as well as triangular shape.

The microcapsules dispersed in pure water by 10% are coated on the first board with the above-described electrodes 7 and 8, and thereafter, dried at about 100° C., so as to remove the pure water. After the microcapsules are dried, the shells are melted and adhered to each other, so as to close the clearances between the microcapsules 13 of FIG. 11.

Figure 12:
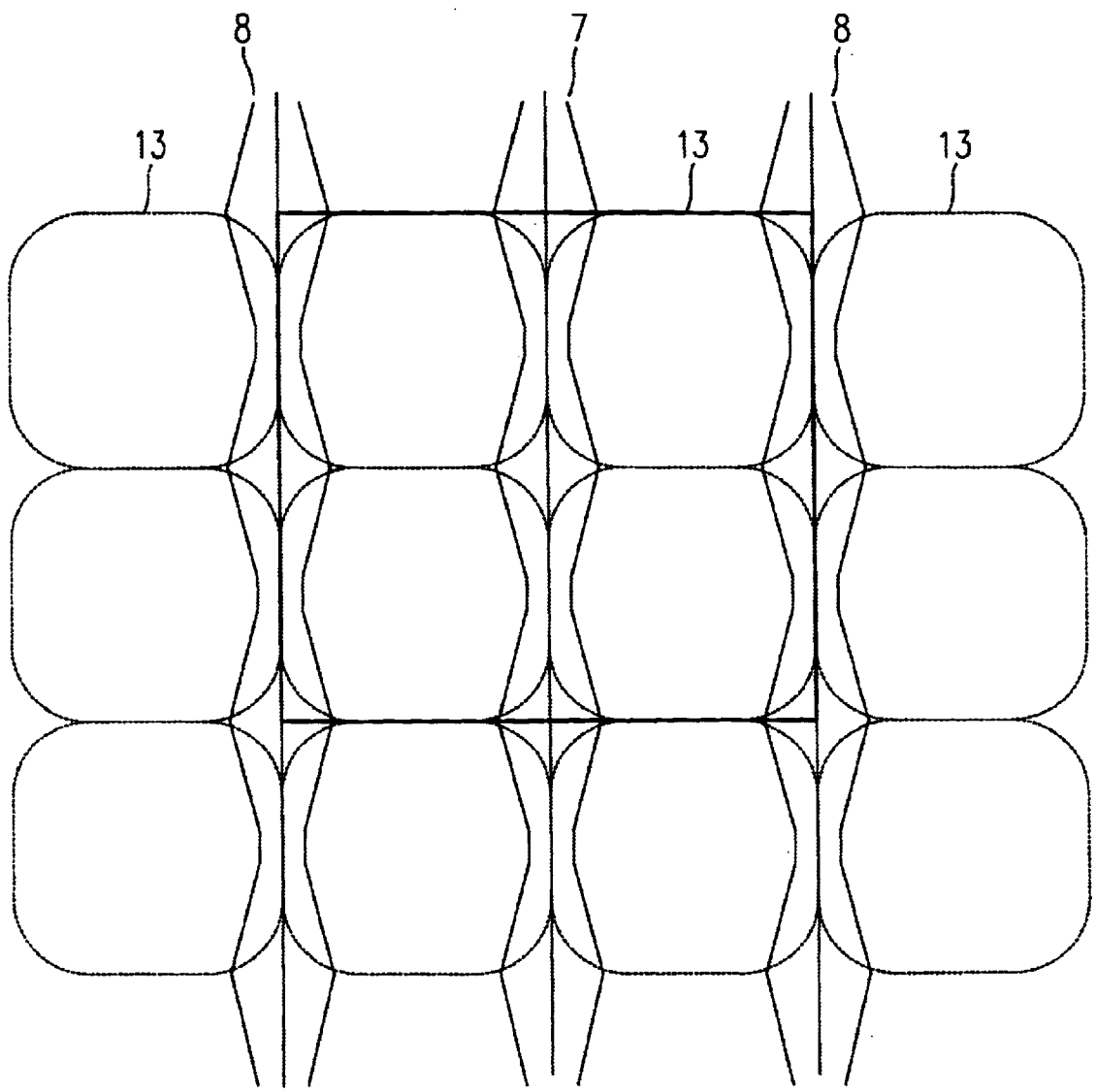
FIG. 12 is a plan view of a pattern of the projections and microcapsules of the electrophoresis display device according to the fifth embodiment of the present invention.

FIG. 12 is a plan view of a pattern of the microcapsules and projected electrodes of the electrophoresis display device according to the fifth embodiment of the present invention.

Although the sectional shapes of the first and the second electrodes 7 and 8 of FIG. 11 are triangular, the widths of the bottom faces differ depending on positions of the electrodes. Further, a center of each side of the microcapsules 13 is aligned with portions of the narrowest width of the electrodes 7 and 8 as shown in FIG. 12.

Figure 13:
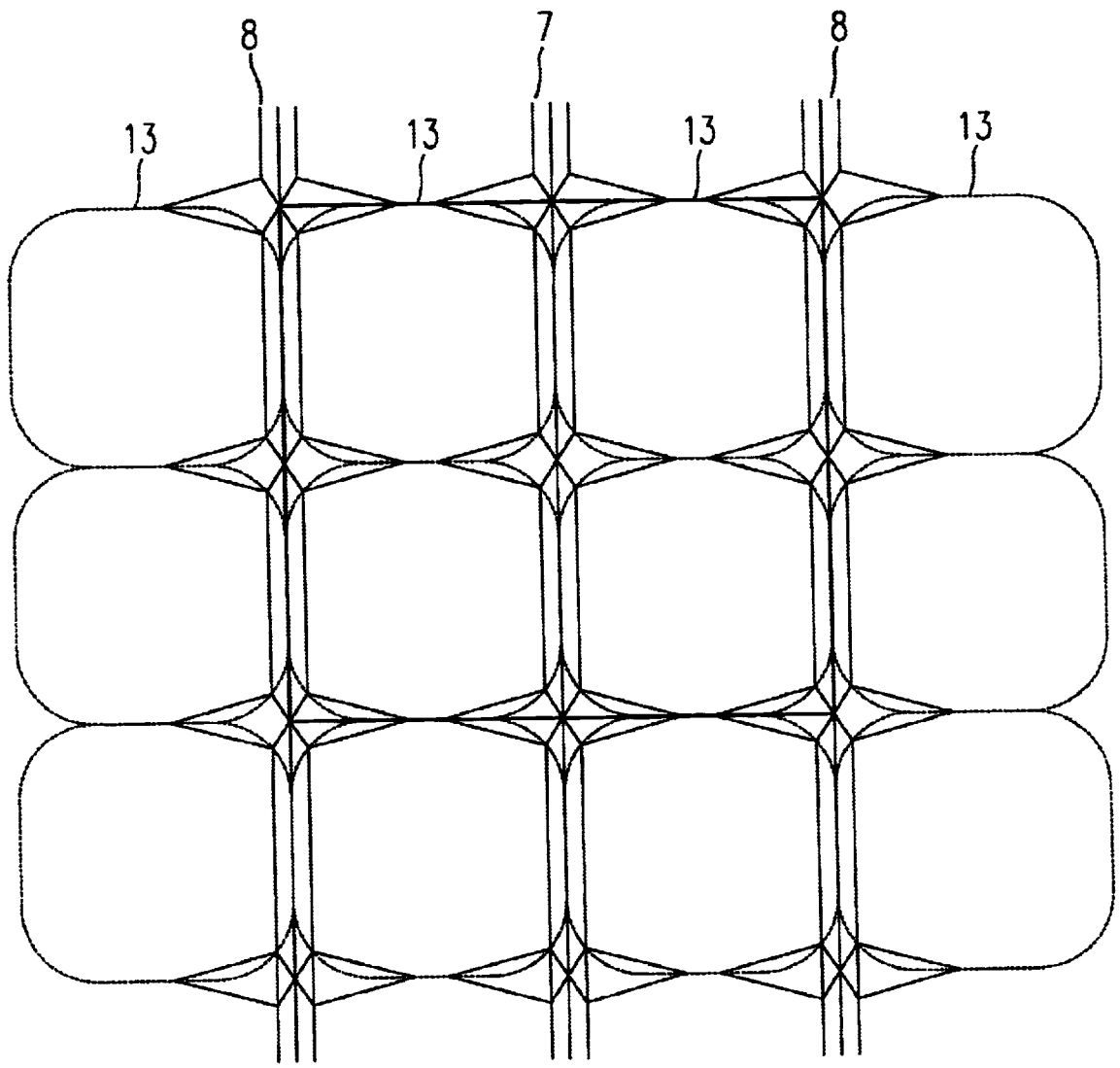
FIG. 13 is a plan view of another pattern of the projection of the electrophoresis display device according to the fifth embodiment of the present invention.

FIG. 13 is a plan view of another pattern of the projected electrodes of the electrophoresis display device according to the fifth embodiment of the present invention. As shown, the electrodes 7 and 8 have a shape in which crosses are arranged continuously in parallel in the column direction.

Figure 14:
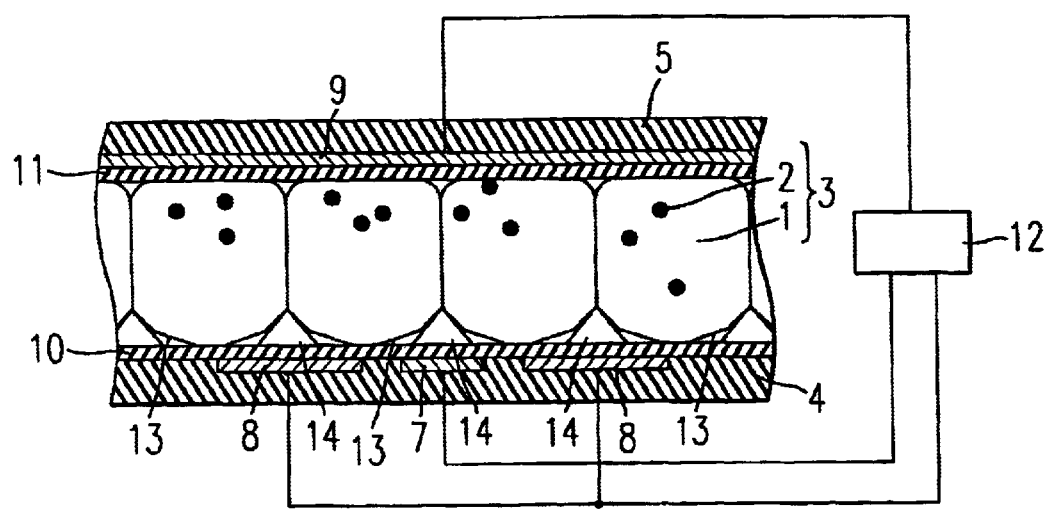
FIG. 14 is a cross-sectional view of part of a cell series accompanied with a power source unit coupled to electrodes for explaining another example of projections of the electrophoresis display device according to the fifth embodiment of the present invention.

Next, FIG. 14 is a cross-sectional view of part of a cell series accompanied with a power source unit coupled to respective electrodes for explaining another example of the projection of the electrophoresis display device according to the fifth embodiment of the present invention.

The electrodes 7 and 8 are not used for positioning the microcapsules 13, but rather the projections 14 shown in FIG. 14 are used to positionally align the microcapsules 13. Each of the first and the second electrodes 7 and 8 has a flat-plate shape on the first board 4.

Figure 15:
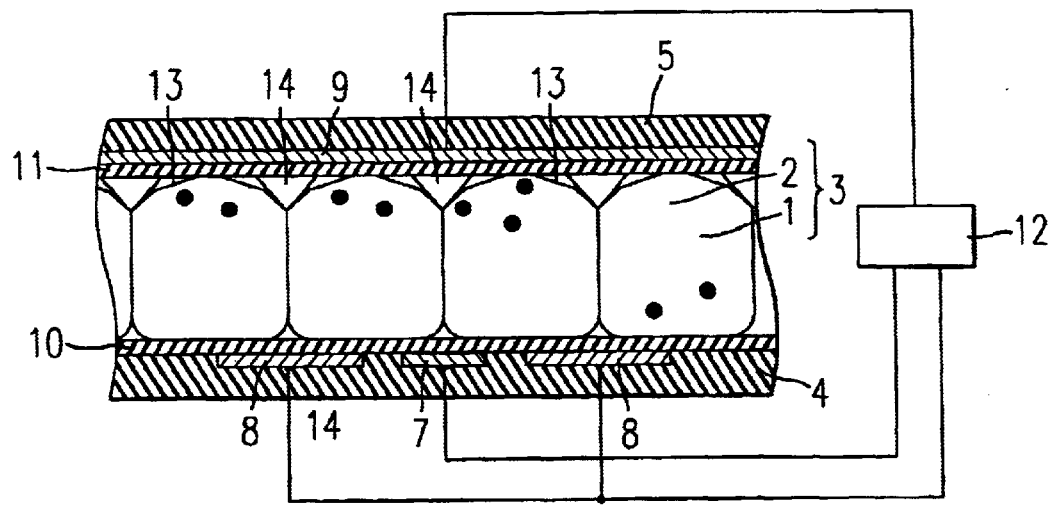
FIG. 15 is a cross-sectional view of part of a cell series using another of the projections accompanied with a power source unit coupled to electrodes of the electrophoresis display device according to the fifth embodiment of the present invention.

FIG. 15 is a cross-sectional view of part of a cell series using another example of the projections. As shown, the projections 14 may be formed at a microcapsule side surface of the second board 5 to positionally align the microcapsules. In the structures of FIGS. 14 and 15, the projections 14 are independent from the electrodes 7 and 8. Therefore, the projections are not formed with a conductive material, but are formed with an insulating material.

The rewrite operation described in the first embodiment may also be applied to the structures shown in FIGS. 11–15, thereby being able to control the movement of the electrophoresis particles 2.

Figure 16A:
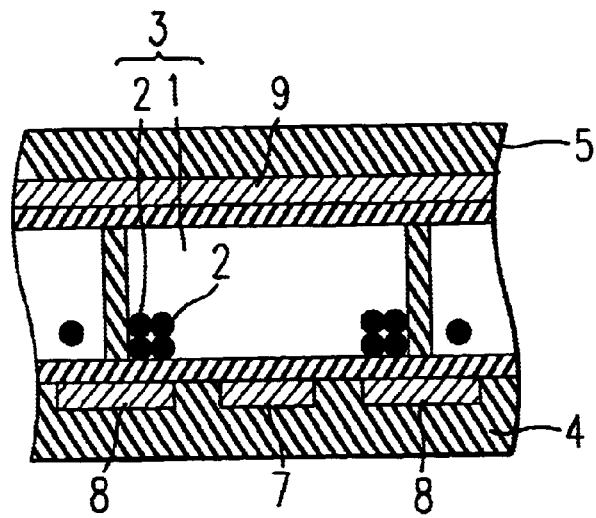
FIGS. 16A and 16B are cross-sectional views of part of a cell series of an electrophoresis display device according to a sixth embodiment of the present invention.
Figure 16B:
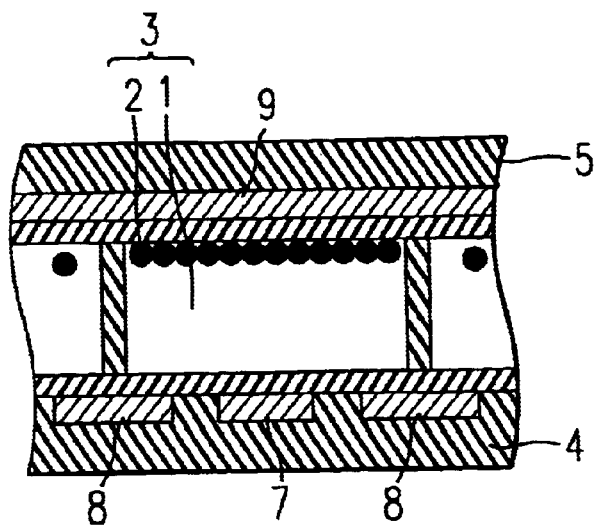

Turning now to FIGS. 16A and 16B, which are cross-sectional views of part of a cell series of an electrophoresis display device according to a sixth embodiment of the present invention.

The dispersion liquid 3 of the sixth embodiment includes a dyed solvent 1 and the colored electrophoresis particles 2. In this embodiment, when the electrophoresis particles 2 of FIG. 16A gather at the corners of the cell, the cell displays the color of the solvent 1. Thus, an observer sees the color of the solvent 1 from the side of the second board 5. When the electrophoresis particles 2 gather on the side of the second board 5 as shown in FIG. 16B, the cell displays the color of the electrophoresis particles 2. An appropriately adjusted dye concentration of the solvent 1 can be used to conceal the color of the electrophoresis particles 2 near the second electrode 8.

The method of applying voltages to the first, second and third electrodes 7, 8 and 9 described in the first embodiment is also applicable to the sixth embodiment, thereby controlling the movement of the electrophoresis particles 2.

Figure 17:
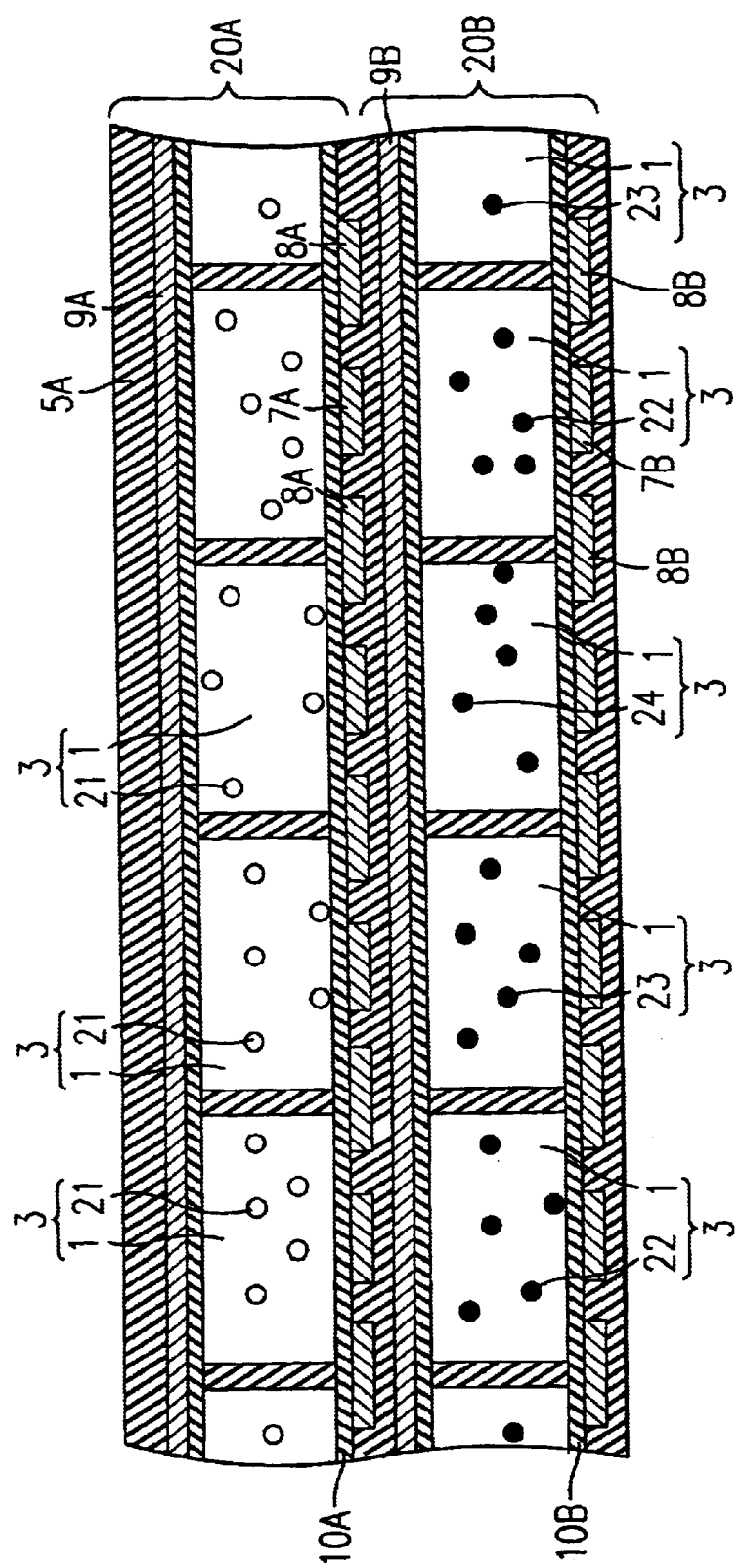
FIG. 17 is a cross-sectional view of part of a electrophoresis display device according to a seventh embodiment of the present invention.

Next, FIG. 17 is a cross-sectional view of part of a multicolor electrophoresis display device according to a seventh embodiment of the present invention.

A multicolor display can be realized by providing a color filter on a transparent board of the observation side, for example, by coating the dielectric layer 10 with different colors between the pixels, using electrophoresis particles having different colors between the pixels, using insulating liquids resolved with different dyes between the pixels or their equivalents. With these methods, the colors white and black are displayed using a mixture of colors and the resolution may reduce, particularly when displaying text.

According to the electrophoresis display device of the seventh embodiment, a plurality of colors, for example white, black and a third color, can be displayed for a respective pixel using a stack of a plurality of layers for one pixel.

As shown, the cross-sectional view of FIG. 17 has two cell series 20A and 20B each having the same structure of the cell series of FIG. 1, except the dielectric layer 10A of the first cell series is made of a colorless transparent material. The cross-sectional structure of the seventh embodiment may also have laminated cell series, each having a structure of the second through the sixth embodiments.

In addition, white electrophoresis particles 21 of first cell series 20A are dispersed in the colorless transparent insulating liquid 1. Each of electrophoresis particles 22, 23 and 24 of the second cell series 20B has a color different from neighbor cells and is dispersed in the colorless transparent insulating liquid 1. The colors of the electrophoresis particles 22, 23 and 24 may be red, blue and green or another set of three colors. Further, a set of the three cells is repeatedly aligned in one direction of the second cell series 20B.

Figure 18A:
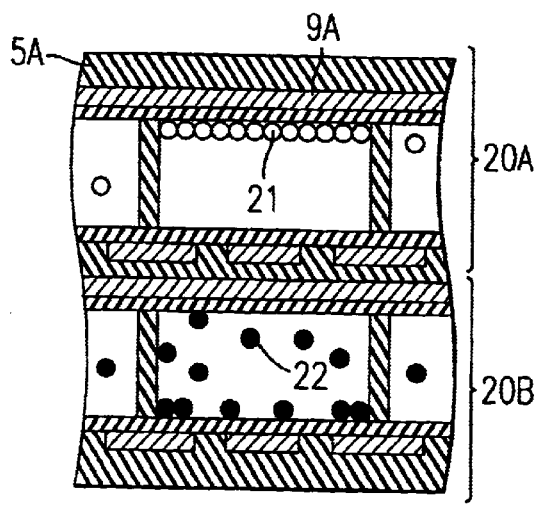
FIGS. 18A, 18B and 18C are cross-sectional views of part of a cell series of an electrophoresis display device according to the seventh embodiment of the present invention.
Figure 18B:
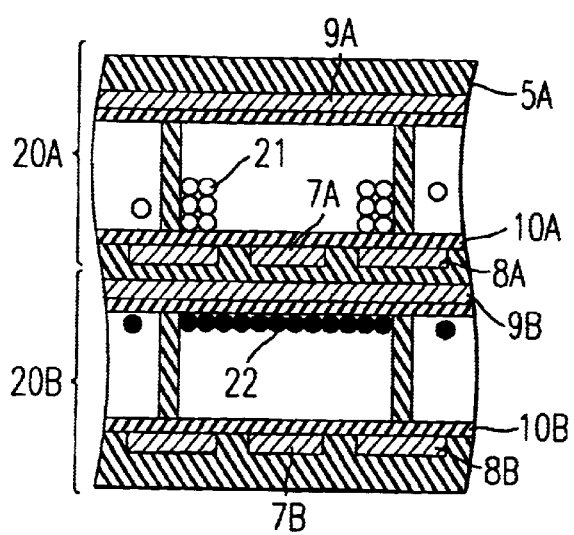
Figure 18C:
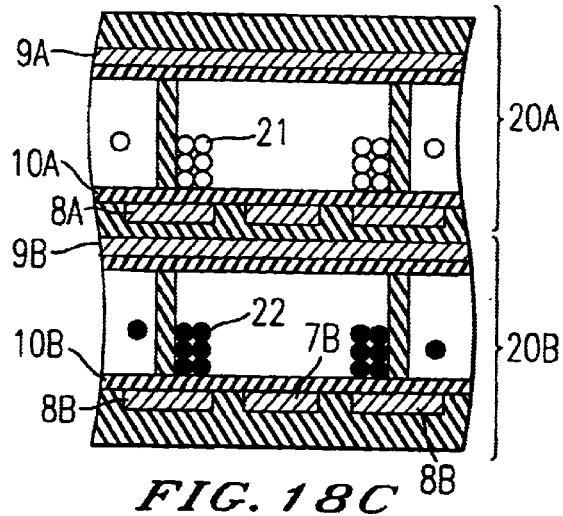

FIGS. 18A, 18B and 18C are cross-sectional views of part of a cell series of an electrophoresis display device according to the seventh embodiment of the present invention.

When the white electrophoresis particles 21 of the first cell series 20A in FIG. 18A are gathered along a third electrode 9A near the transparent board 5A on the side of the observer, the stacked cells (the pixel) show the white color of the electrophoresis particles 21. As shown, the electrophoresis particles 22 in the cell of the second cell series 20B may be present at an arbitrary location.

When, the white electrophoresis particles 21 of the cell series 20A in FIG. 18B are gathered onto the second electrodes 8A and the electrophoresis particles 22 in the second cell series 20B gather along the third electrode 9B, the stacked cells (the pixel) show the color of the electrophoresis particles 22.

When the white electrophoresis particles 21 of the first cell series 20A in FIG. 18C gather near the second electrodes 8A of the cell and the electrophoresis particles 22 in the second cell series 20B gather near the second electrodes 8B of the cell, the stacked cells (the pixel) display the color of the dielectric layer 10B. If the color of the dielectric layer 10B is black, the stacked cells (the pixel) can display three colors of white, black and another color different from white and black. The resolution of a white and black uni-color display can be promoted and the high image quality in displaying the text can be attained.

Figure 19:
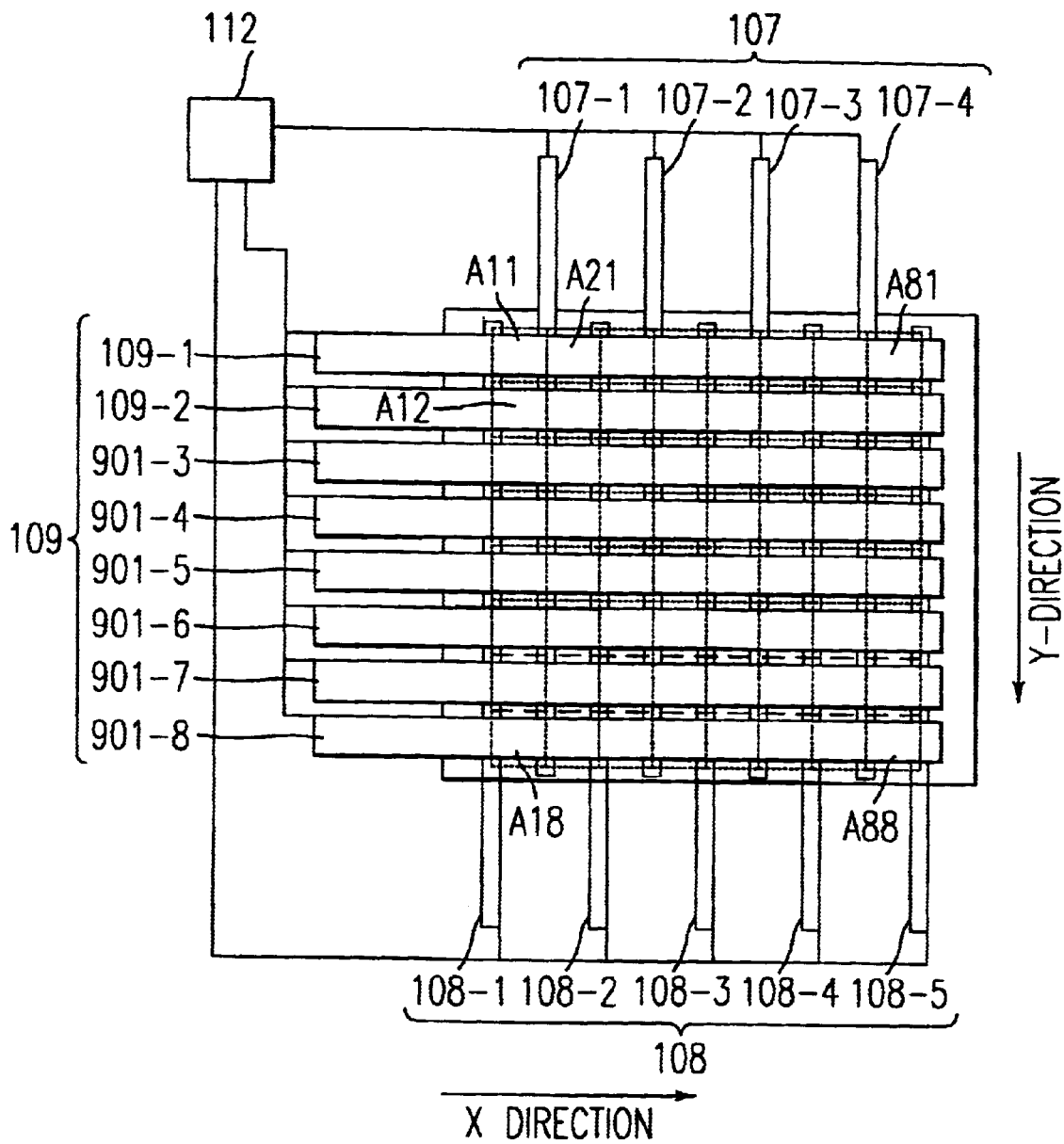
FIG. 19 is a plan view from a side of a second board of an electrophoresis display device according to an eighth embodiment of the present invention.

FIG. 19 is a plan view from a side of a second board of an electrophoresis display device according to an eighth embodiment of the present invention.

A plurality of cells are aligned in two dimensions, namely an X-direction and a Y-direction of FIG. 19. The display device of FIG. 19 has 64 (8×8) cells each indicated by broken lines. Cells A11, A21, A31, A41, A51, A61, A71 and A81 are aligned in an X-direction and correspond to a 1$^{st}$ row cell series and cells A11, A12, A13, A14, A15, A16, A17 and A18 are aligned in a Y-direction and correspond to a 1$^{st}$ column cell series. Each of the cell series aligned in the X-direction can be referred as a row cell series and each of the cell series aligned in the Y-direction can be referred as a column cell series.

As shown in FIG. 19, a plurality of first electrode layers 107 and a plurality of second electrode layers 108 are arranged on a board. Further, each of the layers has a stripe-shape extending in a Y-direction, and the first and second electrodes 107 and 108 are alternately aligned. The first electrode 107 is arranged along a boundary of two column cell series contiguous to each other in a X-direction. For example, the first electrode 107-1 is arranged on a boundary between the first and second column cell series respectively starting from A11 and A21.

Thus, by applying a predetermined electrical potential to the first electrodes 107, an electrical field can be formed inside of each cell of the two cell series formed near the electrode 107. In addition, each of the second electrodes 108, except electrodes 108-1 and 108-5, is arranged along a boundary between two column cell series aligned, whereby the electrical potential applied to one of the second electrodes 108 affects each electric field formed inside of each cell of the two adjacent column cell series.

The third electrodes 109 made of a light transmitting conductive material are formed near an objective side of the display device. The third electrodes have 8 stripes extended in the X-direction and corresponding to respective row cell series.

Figure 20:
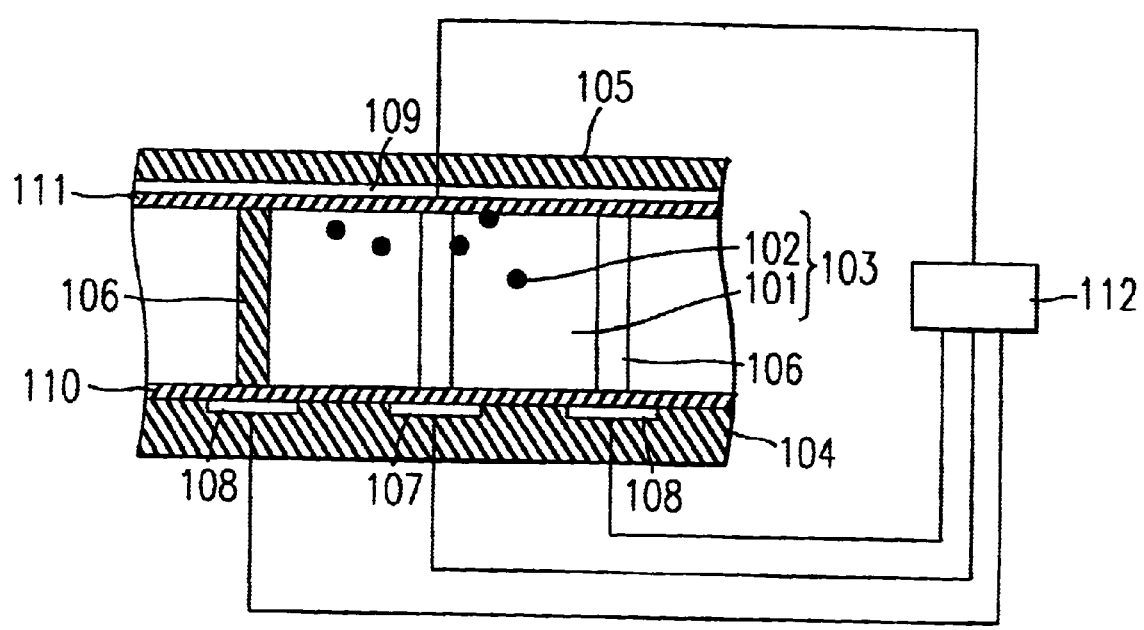
FIG. 20 is a cross-sectional view of part of a cell series of the electrophoresis display device of FIG. 19.

Next, FIG. 20 is a cross-sectional view of part of a cell series of the electrophoresis display device of FIG. 19 and the cross-sectional view of FIG. 20 extends in the X-direction of FIG. 19. According to the electrophoresis display device of this embodiment, the electrophoresis particles 102 of the cell are subjected to electrophoresis directed to the first electrode 107, the second electrode 108 or the third electrode 109 of FIG. 20, depending on the electric field formed through the first electrode 107, the second electrode 108 and the third electrode 109. Further, a width of each of the third electrodes 109 is formed substantially as wide as the width of each cell so that a color of the electrophoresis particles 102 gathered near the third electrode 109 is optically recognized. The widths of the first and the second electrodes 107 and 108 are narrower than the width of corresponding cell series, whereby the electrophoresis particles 102 gathered near the first electrode 107 or the second electrode 108 are not detected.

According to the electrophoresis display device of the eighth embodiment, the simple matrix structure can be attained by having the plurality of electrodes extend in the Y-direction at one surface of the display device and the plurality of electrodes extend in the X-direction at the other surface of the display device. The numbers of the electrodes for the display device having L×M cells (pixels) are not large with effective overlapped regions a with (L+1) pieces of the electrodes including first and second electrodes 107 and 108 and M pieces of the third electrodes 109. Each of the electrodes has a simple stripe-shape, thereby increasing the cell density.

In addition, a voltage applied to the respective electrodes can be controlled by a power source unit 112, which includes a first power source unit, a second power source unit, a third power source unit, and a CPU (Central Processing Unit). For example, 4 pieces of the first electrodes 107-1, 107-2, 107-3, and 107-4 may be coupled to the first power source unit of power source unit 112 and the CPU. Each of the first electrodes 107 can be applied with a voltage inherent to itself and independent of the other first electrodes 107, and a voltage applied to each first electrode 107 may be controlled by a control signal transmitted from the CPU. Similarly, 5 pieces of the second electrode 108 may be coupled to the second power source unit, and 8 pieces of the third electrode 109 may be respectively coupled to the third power source unit. Each of the second electrodes 108 as well as each of the third electrodes 109 is applied with an inherent and independent voltage of the other third electrodes 109 from the respective power source unit, in accordance with the control signal transmitted from the CPU.

Further, a predetermined electrical field at an inside of the respective cell may be used to control the display color of the respective cell. Also, the dispersion liquid 103 of the cell of FIG. 20 is held at an area formed by the first and second boards 104 and 105, each supporting first and second dielectric layers 110 and 111, partition walls 106 extending in the Y-direction of FIG. 19 and other partition walls (not shown) extending in the X-direction. The display device also has a plurality of cells, each containing the dispersion liquid 103.

The first electrodes 107 and the second electrodes 108 are formed on the first board 104, and the third electrodes 109 are formed on the second board 105. The dispersion liquid 103 contains dispersed electrophoresis particles 102 in a colorless transparent insulating liquid 101, and the electrophoresis particles 102 are colored, for example black, and have a positive or negative electric charge. The electrophoresis particles 102 are subjected to electrophoresis in the insulating liquid 101 in accordance with an electric field formed in the insulating liquid 101 by the first electrode 107, the second electrode 108 and the third electrode 109.

The observational surface is the side of the second board 105 and the first dielectric layer 110 is given a contrastive color, for example white, of the color of the electrophoresis particles. The second dielectric layer 111 arranged near the side of the observational surface is transparent. The second board 105 and the third electrodes 109 of the side of the observational surface are also made of light transmitting materials.

An explanation will now be given of a case in which each cell corresponding to each pixel is formed in a cube-shape of about 40 μm×40 μm×40 μm, and the electrophoresis particles 102 are charged positively. A cell to be written maintains a hold state and then is brought into an initial and a display state and maintains the hold state. As the hold state, a voltage of 60 V is applied to the first electrode 107 and a voltage of 15 V is applied to the second electrode 108.

Figure 21:
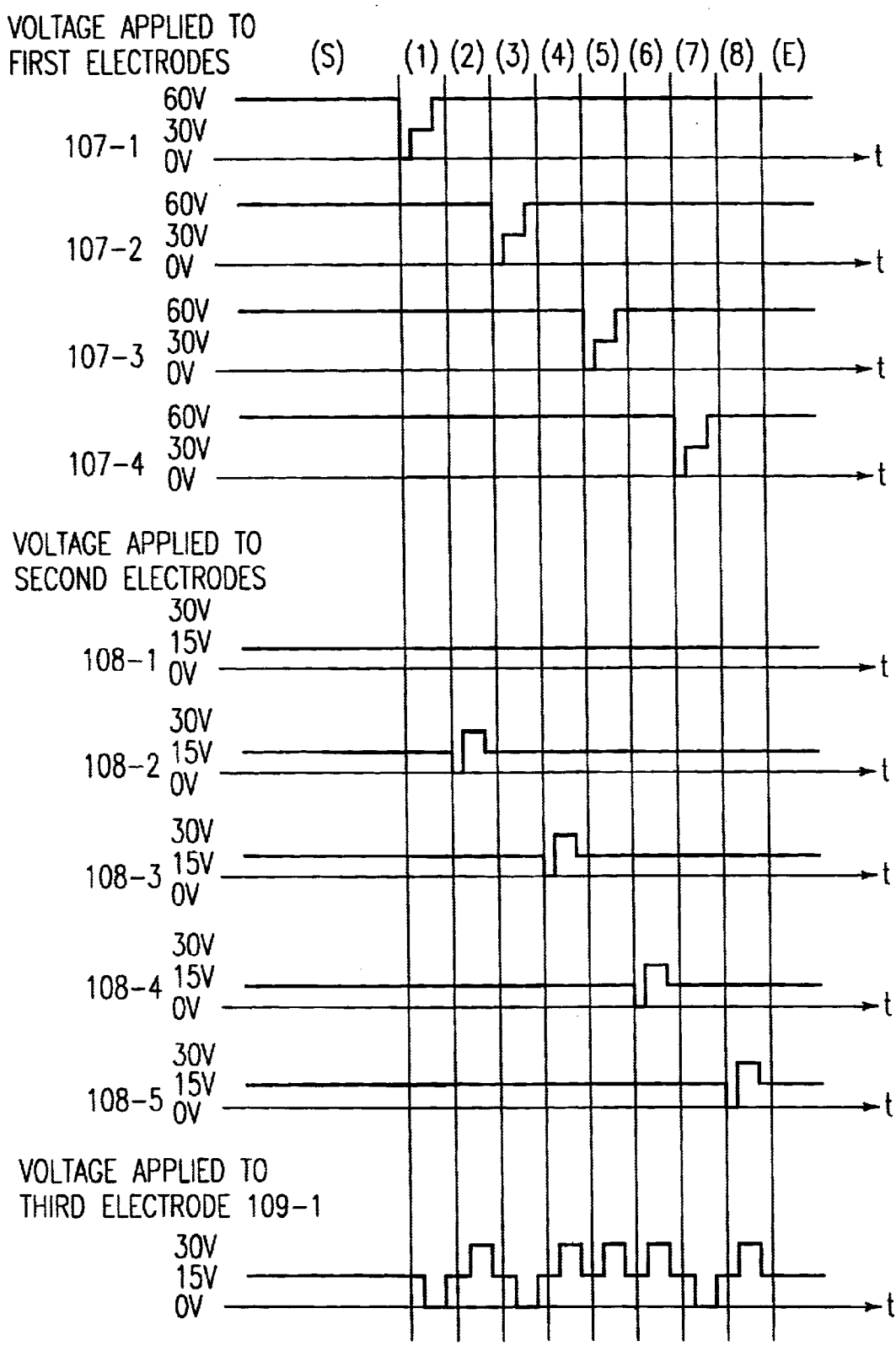
FIG. 21 is a timing diagram for rewriting 8 cells of the cell series according to the eighth embodiment of the present invention.

FIG. 21 is a timing diagram for rewriting 8 cells of a cell series according to the eighth embodiment of the present invention.

The cell series rewritten by the operation of FIG. 21 is the 1$^{st}$ row cell series corresponding to the third electrode 109-1. The variable "t" in FIG. 21 indicates time, and the variable "voltages" in FIG. 21 are voltages applied to each of the first, second and third electrodes 107, 108 and 109-1. Thus, the chart represents the voltages applied to the respective electrodes over time.

In rewriting the 1$^{st}$ row cell series, time bands are provided for executing three steps of forming an initializing electric field of the cell, forming a rewriting electric field and forming the hold state. The three steps are executed at respective time bands (1), (2), (3), (4), (5), (6), (7) and (8), each corresponding to rewriting a cell at an intersection of the $1^{st}$ row and the same number column. The time band (S) in FIG. 21 designates a time band in which a previous image is displayed, and the time band (E) in FIG. 21 designates a time band after rewriting is finished.

At the time band (S), the first electrodes 107-1, 107-2, 107-3 and 107-4 are applied with 60 V, the respective second electrodes 108-1, 108-2, 108-3, 108-4 and 108-5 are applied with 15 V, and the third electrode 109-1 is applied with 15 V.

At the time band (1), the first electrode 107-1 is applied with 0 V, thereby forming the initializing electric field inside of a $1^{st}$ row and $1^{st}$ column cell. Further, successively, the voltage applied to the first electrode 107-1 is changed to 30 V, the voltage applied to the third electrode 109-1 is changed to 0 V or 30 V to form the rewriting electric field inside of the $1^{st}$ row and $1^{st}$ column cell. In addition, the voltage applied to the first electrode 107-1 is changed to 60 V, thereby bringing the $1^{st}$ row and $1^{st}$ column cell into the hold state. The third electrode 109-1 is applied with 15 V so as to return the electric field formed in the cell to the electric field of the time band (S).

After the time band (1) elapses, the voltage applied to the second electrode 108-2 is changed to 0 V in the time band (2) thereby forming the initialization electric field inside of a $1^{st}$ row and $2^{nd}$ column cell. Successively, the voltage applied to the second electrode 108-2 is changed to 30 V and the voltage applied to the third electrode is changed to 30 V or 0 V, thereby forming the rewriting electric field inside of the $1^{st}$ row and $2^{nd}$ column cell. Thereafter, the voltage applied to the second electrode is changed to 15 V so as to bring the $1^{st}$ row and $2^{nd}$ column cell into the hold state. In the hold state, 15 V is applied to the third electrode 109-1, thereby bringing the electric field formed inside of the $1^{st}$ row and $2^{nd}$ column cell into the same state as that of the time band (S).

At a time band (2n+1; n is an integer of 0 or larger) in rewriting a cell at an odd number column, the voltage of the first electrode 107-(n+1) is changed to 0 V, thereby forming the initializing electric field inside of a $1^{st}$ row and (2n+1)-th column cell, and successively, the voltage applied to the first electrode 107-(n+1) is changed to 30 V. Then, the voltage applied to the third electrode 109-1 is changed to 0 V or 30 V, thereby forming the rewriting electric field inside of the $1^{st}$ row and (2n+1)-th column cell. Thereafter, the voltage applied to the first electrode 107-(n+1) is changed to 60 V to bring the $1^{st}$ row and (2n+1)-th column cell into the hold state. When the voltage of 15 V is applied to the third electrode 109-1 in the hold state, the electric field formed in the cell returns to the same state as the electric field of the time band (S).

At a time band (2n+2) in rewriting a cell at a column of an even number, the voltage applied to the second electrode 108-(n+2) is changed to 0 V, thereby forming the initializing electric field inside of a $1^{st}$ row and (2n+2)-th column cell. Successively, the voltage applied to the second electrode 108-(n+2) is changed to 30 V and the voltage applied to the third electrode 109-1 is changed to 30 V or 0 V, thereby forming the rewriting electric field inside of the $1^{st}$ row and (2n+2)-th column cell. Thereafter, the voltage applied to the second electrode 108-(n+2) is changed to 15 V so as to bring the $1^{st}$ row and (2n+2)-th column cell into the hold state. Similar to the time band (1), in the hold state, a voltage of 15 V is applied to the third electrode 109-1, thereby bringing the electric field formed inside of the $1^{st}$ row and (2n+2)-th column into the same state as that of the time band (S).

After rewriting the (2n+1)-th column cell, the voltage applied to the first electrode 107-(n+1) of FIG. 21 is held at 60 V and the voltage applied to the second electrode 108-(n+1) is held at 15 V to maintain the cell of $1^{st}$ row and (2n+1)-th column in the hold state. Similarly, after rewriting the (2n+2)-th column cell, the voltage applied to the first electrode 107-(n+1) is held at 60 V, the voltage applied to the second electrode 108-(n+2) is held at 15 V to maintain the (2n+1)-th column cell in the hold state.

In rewriting the image, the control method differs between the odd and even number columns as described above. An explanation will now be given of a case of rewriting a cell at a $1^{st}$ column as an example of the odd number columns, and a cell at the $2^{nd}$ column as an example of the even number columns.

FIGS. 22A, 22B1, 22B2, 22B3, 22B4, 22C1, 22C2, 22C3, and 22C4 are cross-sectional views for explaining a movement of electrophoresis particles during a rewrite operation of a $1^{st}$ column cell series according to the eighth embodiment of the present invention. A hatched region of each of the figures indicates a position of the electrophoresis particles 2 as a result of electrophoresis.

First, FIG. 22A is a cross-sectional view of each cell of the $1^{st}$ column cell series. As shown, each cell has the first and the second electrodes 107-1 and 108-1 at lower corners, and the third electrode 109-n at an upper surface of the cell (n is an integer corresponding to each row).

FIGS. 22B1, 22B2, 22B3 and 22B4 are cross-sectional views of a cell of the $1^{st}$ row and $1^{st}$ column with respective voltages shown in place of the corresponding electrodes, while cross-sectional views of FIGS. 22C1, 22C2, 22C3 and 22C4 correspond to a cell of the $2^{nd}$ row and $1^{st}$ column cell with respective voltages shown in place of the corresponding electrodes.

FIGS. 23A, 23B1, 23B2, 23B3, 23B4, 23C1, 23C2, 23C3 and 23C4 are cross-sectional views for explaining a movement of electrophoresis particles during a rewrite operation of a cell of $2^{nd}$ column series according to the eighth embodiment of the present invention. A hatched region of each of the figures indicates a position of the electrophoresis particles 2 as a result of electrophoresis.

Each cell of the $2^{nd}$ column cell series has the first electrode 107-1 at the left corner of the cell, the second electrode 108-2 at the right corner of the cell, and the third electrode 109-n at an upper surface of the cell.

Cross-sectional view of FIGS. 23B1, 23B2, 23B3 and 23B4 show a behavior of the electrophoresis particles 2 of a cell of a $1^{st}$ row and $2^{nd}$ column with respective voltages shown in place of the corresponding electrodes. Cross-sectional view of FIGS. 23C1, 23C2, 23C3 and 23C4 show behavior of the electrophoresis particles of a cell of a $2^{nd}$ row and $2^{nd}$ column cell with respective voltages shown in place of the corresponding electrodes.

Hold State Before Rewriting

All of the first and second electrodes 107, 108 in FIG. 22B1, FIG. 22C1, and FIG. 23B1, FIG. 23C1 are supplied with the following hold voltages.

First electrode 107: 60 V

Second electrode 108: 15 V

All of the third electrodes 109 are supplied with a voltage of 0 V through 30 V.

Initialized State: $1^{st}$ Column

The following initial voltages are supplied to the first electrode 107-1 and the second electrode 108-1 neighboring the $1^{st}$ column cell series.

First electrode 107-1; 0 V

Second electrode 108-1; 15 V

All of the third electrodes 109-n are supplied with the following initial voltage.

Third electrode 109-n; 15 V

With the initializing electric field formed inside of the cell, the electrophoresis particles 2 present at the $1^{st}$ column are subjected to electrophoresis and gather respectively to the right side near the first electrode 107-1 as shown in FIGS. 22B2 and 22C2.

Rewriting State: 1st Pixel Column

The first electrode 107-1 and the second electrode 108-1 are supplied with the following rewriting voltage.

First electrode 107-1; 30 V

Second electrode 108-1; 15 V

When the $1^{st}$ row and $1^{st}$ column cell is intended to display a black color, the third electrode 109-1 at the $1^{st}$ row is supplied with the following signal voltage.

Third electrode 109-1; 0 V (black)

By rewriting electric field formed inside of the cell, the electrophoresis particles 2 of FIG. 22B3 are subjected to electrophoresis and gather near the third electrode 109-1. As a result, when the display device is observed from the side of the third electrode 109-1, the cell is optically recognized as black.

When the $2^{nd}$ row and $1^{st}$ column cell is intended to display a white color, the third electrode 109-2 at the $2^{nd}$ row is supplied with the following signal voltage.

Third electrode 109-2; 30 V (white)

At this occasion, by rewriting the electric field formed inside of the cell, the electrophoresis particles are subjected to electrophoresis and gather to the second electrode 108-1 as shown in FIG. 22C3. As a result, when the display device is observed from the side of the third electrode 109, the cell of FIG. 22C3 is optically recognized as white.

The rewriting electric field is formed by supplying a signal voltage of either of 0 V and 30 V respectively, simultaneously to 8 pieces of the third electrodes 109-1, 109-2, 109-3, 109-4, 109-5, 109-6, 109-7 and 109-8. Further, all of the cells at the $1^{st}$ column can respectively be rewritten simultaneously to an arbitrary color of white or black.

Hold State: $1^{st}$ Column

After the rewriting operation, the first electrode 107-1 and the second electrode 108-1 neighboring the $1^{st}$ column cell series are supplied with the following voltages, thereby bringing about the hold state.

First electrode 107-1; 60 V

Second electrode 108-1; 15 V

The voltages supplied to the first electrode 107-1 and the second electrode 108-1 are maintained during a time period until the $1^{st}$ column cell series is successively rewritten.

When the first electrode 107-1 is maintained at 60 V and the second electrode 108-1 is maintained at 15 V, even when the voltage supplied to the third electrode 109-n is varied between 0 and 30 V, a direction of a hold electric field formed inside of the cell remains unchanged at the place where the electrophoresis particles 2 gather, and the electrophoresis particles 2 are held at the position of the rewriting state of FIGS. 22B4 and 22C4.

A $2^{nd}$ column cell series is subsequently rewritten and the $1^{st}$ and $2^{nd}$ columns cell series commonly own first electrode 107-1. Therefore, the hold voltage of 60 V of the first electrode 107-1 needs to be maintained.

Initialized State: $2^{nd}$ Column

A cell at a $2^{nd}$ column is initialized after bringing the $1^{st}$ column cell series into the hold state, the first electrode 107-1 is held at 60 V and the second electrode 108-2 is held at 15 V. In this state, electrophoresis particles 102 of FIGS. 23B1 and 23C1 are present near the third electrodes 109.

From this state, the first electrode 107-1 and the second electrode 108-2 neighboring the $2^{nd}$ column cell series are supplied with the following voltages.

First electrode 107-1; 60 V

Second electrode 108-2; 0 V

All of the third electrodes 109-n are supplied with the following voltage.

Third electrode 109-n; 15 V

As a result, the initializing electric field is formed inside of the cell, and the electrophoresis particles 102 of FIGS. 23B2 and 23C2 gather near the second electrode 108-2, whereby the state is maintained.

Rewriting State: $2^{nd}$ Column

Successively, the first electrode 107-1 and the second electrode 108-2 are supplied with the following rewriting voltages.

First electrode 107-1; 60 V

Second electrode 108-2; 30 V

When the cell at $1^{st}$ row and $2^{nd}$ column is intended to display a black color, the third electrode 109-1 at the $1^{st}$ row is supplied with the following signal voltage, thereby forming the rewriting electric field at inside of the cell.

Third electrode 109-1; 0 V (black)

Then, the electrophoresis particles 102 of FIG. 23B3 gather near the third electrode 109-1. As a result, when the display device is observed from the side of the third electrode 109, the cell of FIG. 23B3 is optically recognized as black.

When the cell at $2^{nd}$ row and $2^{nd}$ column is intended to display a white color, which is the color of first dielectric layer 110, the third electrode 109-2 at the $2^{nd}$ row is supplied with the following signal voltage.

Third electrode 109-2; 30 V (white)

In this way, the electrophoresis particles 102 of FIG. 23C3 gather to the second electrode 108-2.

As a result, when the display device is observed from the side of the third electrodes 109, the cell is optically recognized as white.

Hold State: $2^{nd}$ Column

By continuing to supply 15 V to the second electrode 108-2 and 60 V to the first electrode 107-1 with respect to the cell displayed with white or black, even when the voltage applied to the third electrode is varied between 0 through 30V, the direction of the electric field near the second electrode 108-2 and the third electrode 109-n remains unchanged. Therefore, the electrophoresis particles 102 stay at the position in the rewriting state of FIGS. 23B4 and 23C4.

An explanation will now be given why the image is held when the signal voltage equal to or higher than 0 V and equal to or lower than 30 V is applied to the third electrode 109-n in the hold state, that is, in the state in which the first electrode 107 of the cell is held at 60 V and the second electrode 108 of the cell is held at 15 V.

Figure 24:
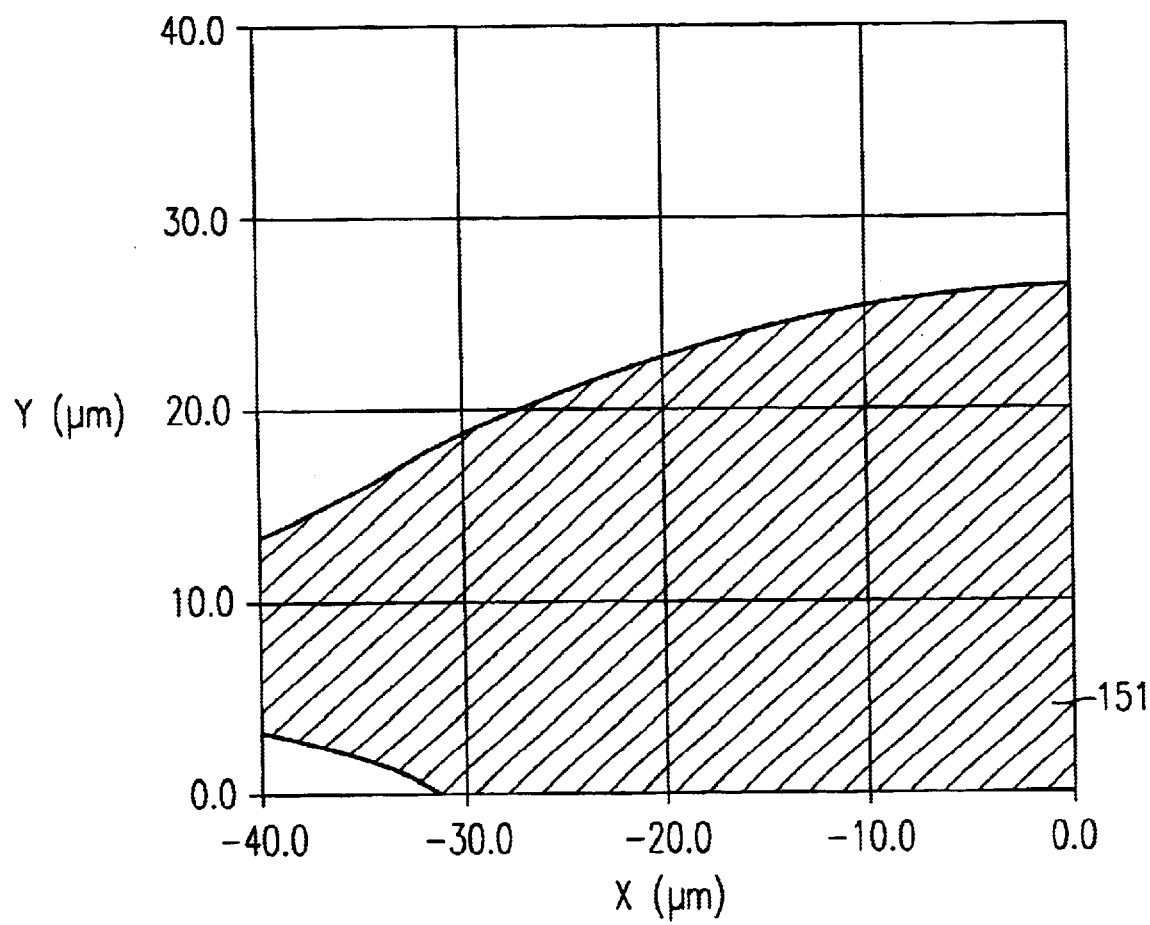
FIG. 24 is a diagram of equipotent line in a cell which is in a maintaining state when one of the electrodes is at 15 V according to the eighth embodiment of the present invention.
Figure 25:
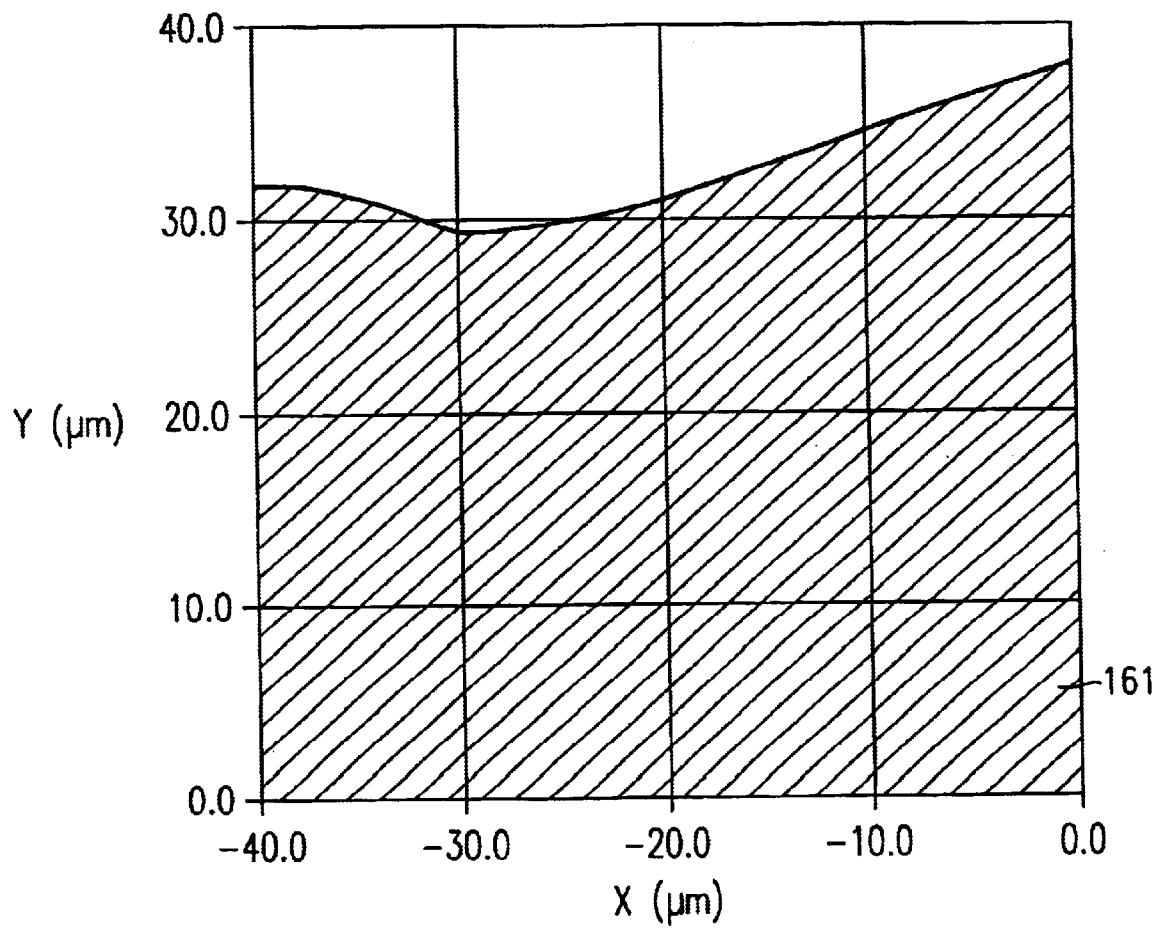
FIG. 25 is a diagram of an equipotent line in one cell which is in a maintaining state when the $3^{rd}$ electrode is at 0 V according to the eighth embodiment of the present invention.

FIGS. 24 and 25 illustrate cross-sectional potential distributions of the cell in the hold state.

When the first electrode 107-1 at the cell's left side is at 15 V, the second electrode 108-2 at the cell's right side is at 60 V and the third electrode 109-n at the top surface of the cell is at 0 V, a hatched region 151 of FIG. 24 indicates an area of a potential exceeding 15 V and prohibits the electrophoresis particles near the first electrode 107-1 or the electrophoresis particles 102 present near the third electrode 109 from transgressing the area 151.

When the first electrode 107 at cell's left lower side is applied with 15 V, the second electrode 108 at cell's right lower side is applied with 60 V and the third electrode 109-n at the cell's top surface is applied with 30 V, a hatched region 161 of FIG. 24 indicates an area in which a potential exceeds 30 V, prohibiting the electrophoresis particles 102 present near the third electrode 109 or the electrophoresis particles 102 present near the first electrode 107 from transgressing the region 161.

In this way, even when the potential of the third electrode 109 of the row is varied between 0 V and 30 V, since the barrier region is formed at a potential higher than that of the first and the third electrodes 107 and 109 between them, the image is held as intended.

Although there are many methods of manufacturing the electrophoresis display device of FIG. 20, one example of the methods is as follows.

Two transparent glass plates having a thickness of about 1 mm are prepared as the first and the second boards 104 and 105.

The first electrode 107 and the second electrode 108 are formed to align in parallel on the surface of the first board 104 by forming an aluminum layer having a film thickness of 0.2 $\mu$m using a sputtering method on the surface of the first board 104 and by etching the aluminum layer. The widths of the two electrodes are set to about 8 $\mu$m, and an interval between the neighboring first and the second electrodes is set to 32 $\mu$m.

The first dielectric layer 110 is formed on the first board 104 via the electrodes, and the first dielectric layer 110 has fluororesin and a small powder of barium sulfate dispersed in the fluororesin. The powder of barium sulfate is white powder and functions as a contrastive color of the electrophoresis particles 102. The fluororesin and barium sulfate are subjected to spin coating on the surface of the first board 4 along with an organic solvent and thereafter dried, thereby forming the first dielectric layer 110 having a film thickness of about 0.5 $\mu$m.

A transparent indium oxide layer of a film thickness of 0.1 $\mu$m is formed on the surface of the second board 105 using a sputtering method, and the transparent indium oxide layer is etched, thereby forming the plurality of strip-shaped third electrodes 109. The width of the respective third electrodes is set to about 8 $\mu$m and an interval between the contiguous electrodes is set to 32 $\mu$m.

The second dielectric layer 111 is formed on the surface of the second board 105 via the third electrode 109. A fluororesin layer having a thickness of about 0.5 $\mu$m is formed on the surface of the second board 105 by dip coating, thereby forming the second dielectric layer 111.

A polyimide layer constituting a dielectric member having a film thickness of about 40 $\mu$m is formed on the first dielectric layer 110. Then, the polyimide layer is etched, thereby forming the first partition walls 106 and the second partition walls of the polyimide. The first partition walls 106 having a width of 5 $\mu$m are formed above and aligned to the first and the second electrodes 107 and 108. Each of the second partition walls having a width of 5 $\mu$m is formed above and aligned to each gap between the third electrodes 109. A pitch of intersections between the two partition walls is 40 $\mu$m.

The dispersion liquid 103 is then filled in a space partitioned by the partition walls. The dispersion liquid 103 includes the transparent insulating liquid 101 including isopropanol and 10 wt % black toner particles having an average particle size of 1 $\mu$m dispersed in the transparent insulating liquid 101.

The surface of the second board 105 formed with the second dielectric layer 111 is adhered onto the partition walls formed above the first board 104. The second board 105 is adhered thereto so the third electrode is orthogonal intersecting with the first and the second electrodes 107 and 108.

The first, the second and the third electrodes 107, 108 and 109 of the display member are connected to the voltage control unit to thereby fabricate the electrophoresis display device.

Figure 26:
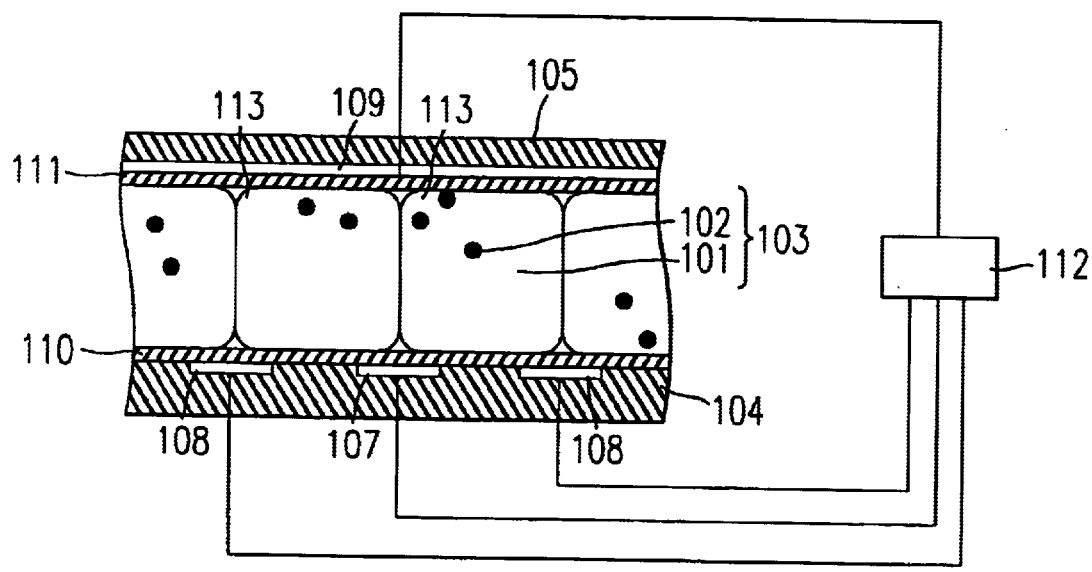
FIG. 26 is a cross-sectional view of part of a cell series accompanied with a power source unit coupled to electrodes of an electrophoresis display device according to a ninth embodiment of the present invention.

Turning now to FIG. 26, which is a cross-sectional view of part of a cell series accompanied with a power source unit coupled to respective electrodes of an electrophoresis display device according to a ninth embodiment of the present invention.

Each of the respective cells (pixels) is formed independently using one microcapsule and the display device has a structure similar to that of the eighth embodiment, except there are two-dimensionally arranged plurality of the microcapsules between the first dielectric layer 110 and the second dielectric layer 111.

A display device using the microcapsule can be fabricated in many ways and one of the methods is as follows.

The first and second electrodes 107, 108 and the first dielectric layer 110 are formed on a surface of the first board 104 of a transparent glass. The first board 104 has a thickness of about 1 mm. The second board 105 is also formed with the third electrode 109 and the second dielectric layer 111.

The microcapsule 113 is fabricated by the Coascelvation method.

11 weight portions of the dispersion liquid 103, the same as that used in the eighth embodiment (dispersion liquid dispersed with toner particles 102 in isopropanol) and 100 weight portions of pure water are stirred to emulsify by a homogenizer along with 2 weight portions of an emulsifier. The emulsified mixture solution is poured into an aqueous solution of 5% geratin-gum arabic at 40° C., thereby forming a state in which the dispersion liquid 103 in the shape of a particle is dispersed in the aqueous solution. 10% acetic acid is poured into the aqueous solution. Adding acetic acid is finished when the ph of the mixture solution becomes 3.5, while stirring the emulsified mixture solution. By adding acetic acid, geratin and gum arabic react with each other, thereby forming a polymer layer at the surface of the partition liquid 103 in the shape of the particle.

After the temperature of the mixture solution is lowered to 5° C., 37% formalin is dropped thereto. Further, an aqueous solution of 10% NaOH is dropped thereto until the pH of the mixture solution becomes 8.5, thereby curing the resin layer. As a result, the microcapsule covering the dispersion liquid 103 by the resin surface layer is provided. The microcapsules have an average particle size 40 $\mu$m with a small particle size distribution.

The microcapsule dispersed in water provided in this way is formed on the surface of the first board 104 and thereafter dried at 100° C. to evaporate a liquid and two-dimensionally arrange microcapsules are melted together. The microcapsules are stabilized in a state of being densely aligned among respective intervals of the first and the second electrodes 107 and 108. Therefore, the microcapsules are two-dimensionally substantially uniformly formed on the surface of the first board 104 both in the Y-direction (direction of extending the first electrode 107 and the second electrode 108) and in the X-direction (direction orthogonal to the first electrode).

The second board 105 with the third electrodes 109 formed on its surface is arranged on the face of the plurality of microcapsules so the respective third electrodes 109 are adjusted to orthogonally intersect with the first and the second electrodes 107 and 108.

The microcapsules forming methods are not limited. For example, the following methods may be used: an interfacial polymerization method, an insitu polymerization method, an in-liquid curing and coating method, a phase separation method from an organic solution species, a melting, dispersing and cooling method, an in-air suspension method, a spray drying method and so on, which may be selected in accordance with use and mode of a record medium.

As an alternative of the geratin-gum arabic a polymer film, condensing species polymer, such as melanine resin, epoxy resin, urea resin, phenolic resin, furan resin or their equivalent, and thermosetting resins, such as crosslinked vinyl terpolymers of styrene-divinylbenzene copolymer, methylmethacrylate-vinylacrylate copolymer or their equivalents can be used.

Two or more types selected from the thermosetting resin and thermoplastic resin can be used for a multi-layered coating of the microcapsule 113. To promote thermal stability of the microcapsule 113, it is preferable to use a known thermosetting resin at an outermost shell of the coating.

A shell material of the microcapsules may be chosen from dielectric materials which can be used for the dielectric layers 110 and 111, thereby using those shells as part of the first and second dielectric layers 110 and 111.

A rewritting operation for the cells of a display device formed by this method was performed. The electrophoresis display device can be rewritten similar to the eighth embodiment, except the hold voltage of the first electrode 107 is set to 150 V. Accurate rewritings can be performed even when rewriting of a contiguous cell is started earlier by shortening a time period of the hold state. This is because the holding voltage is increased, and therefore a time period of rewriting the electrophoresis display device can be shortened.

Figure 27:
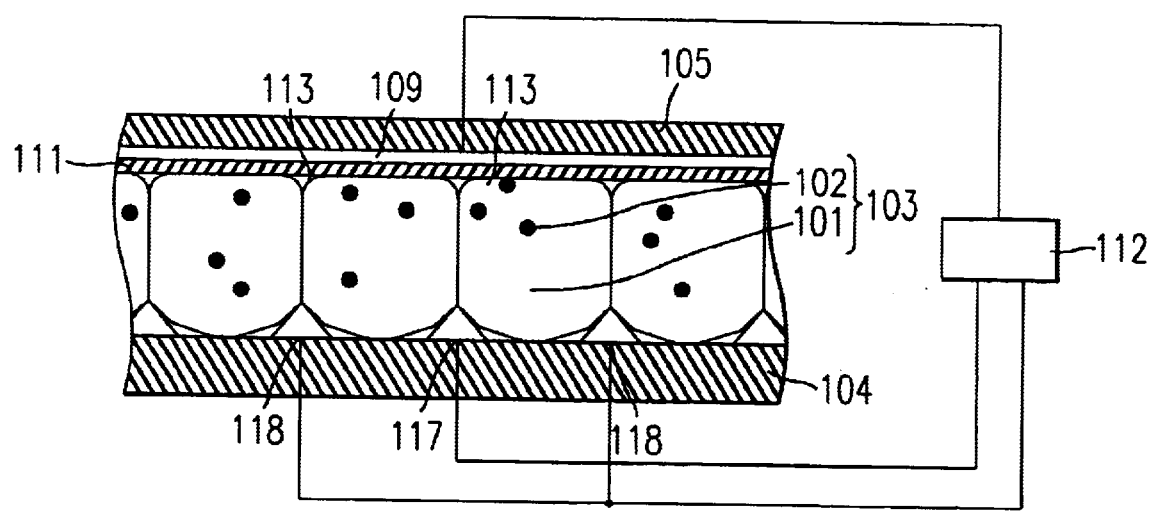
FIG. 27 is a cross-sectional view of part of a cell series accompanied with a power source unit coupled to respective electrodes of a modified example of the electrophoresis display device according to the ninth embodiment of the present invention.

FIG. 27 is a cross-sectional view of part of a cell series accompanied with a power source unit coupled to respective electrodes of a modified example of the electrophoresis display device according to the ninth embodiment of the present invention.

According to this display device, each of first and second electrodes 117 and 118 formed on the first board 104 has a triangular sectionally-shaped projection and each top of the triangular projection of the electrodes faces the microcapsules.

In comparison with the case in which the shape of the electrode is a thin film, when the projected shape shown in FIG. 27 is used, the microcapsules arranged among the respective intervals of the first electrodes 117 and the second electrodes 118 can be further stabilized. Therefore, the microcapsules are easily arranged two-dimensionally.

Specifically, it is preferable to project the electrodes by 10 $\mu$m or more relative to the first board surface. For example, the electrodes may be formed by printing technology or etching technology. According to the printing technology, a projection having a height of about 10 $\mu$m through 20 $\mu$m can be formed by executing screen printing or gravure printing using conductive ink. Further, according to the etching technology, the projection can be formed by etching a board pasted with copper having a thickness of about 15 $\mu$m. When the electrodes are projected by about 15 $\mu$m, even when the electrode shape is quadrangular in section, the effect of stabilizing the microcapsule is sufficiently achieved.

On the first board formed in this way, the microcapsules dispersed in pure water by 10% are coated and thereafter dried at 100° C. to remove moisture. When the microcapsules are dried, the shells are melted together by the strength of the shell of the microcapsule, and as shown by FIG. 27 the clearances among the contiguous microcapsules 113 are closed.

Further, although the projections of an insulating object can be used for positioning the microcapsules 113, it is necessary to provide the first and second electrodes 107 and 108 on the first board 104 separately from the projections and fabrication of the electrophoresis display device is complicated.

As explained above, the electrophoresis display devices according to the respective embodiments of the present invention can change the display by the simple matrix drive, thereby providing the display device at low cost.

Wherein the present invention has been particularly shown and described with reference to preferred embodiments thereof, it will be understood by those skilled in the art that various other changes in the form and details may be made therein without departing from the spirit and scope of the present invention.

We claim:

1. An electrophoresis display device, comprising:
   a first board having a first surface;
   a plurality of first electrodes disposed on the first surface;
   a plurality of second electrodes disposed on the first surface in parallel with the plurality of first electrodes;
   a second board having a second surface facing the first surface;
   a plurality of third electrodes disposed on the second surface, each of the plurality of third electrodes intersecting with the plurality of first electrodes and the plurality of second electrodes;
   a dispersion liquid disposed between the first and the second boards and including an insulating liquid and a plurality of electrophoresis particles charged to a same electrical polarity;
   a first electrical potential supplying unit coupled to the first electrode and configured to apply to the first electrode an initial voltage, a first hold voltage, and a rewriting voltage having a voltage value between the initial voltage and the first hold voltage, said first electrical potential supplying unit applying the initial, first hold and rewriting voltages in an order of the initial voltage, the rewriting voltage and the first hold voltage;
   a second electrical potential supplying unit coupled to the second electrode and configured to apply to the second electrode an intermediary voltage having a voltage value between the initial voltage and the rewriting voltage; and
   a third electrical potential supplying unit coupled to the third electrode and configured to apply to the third electrode a color display voltage having a voltage value different from the intermediary voltage, and a second hold voltage having a voltage value between the initial voltage and the rewriting voltage in synchronism with the first hold voltage.

2. The electrophoresis display device according to claim 1, wherein the first and the third electrical potential supplying units apply the first and the second hold voltages before elapse of a time period necessary for moving the electrophoresis particles from near the first electrode to near the second or the third electrode.

3. The electrophoresis display device according to claim 1, further comprising:
microcapsules interposed between the first and the second boards and configured to hold the dispersion liquid.

4. The electrophoresis display device according to claim 3, further comprising:
projections disposed at a side of the microcapsules of the first surface or the second surface.

5. The electrophoresis display device according to claim 4, wherein the projections disposed on the first surface are the first and the second electrodes.

6. The electrophoresis display device according to claim 1, further comprising:
a plurality of fourth electrodes disposed on a third surface of the second board;
a plurality of fifth electrodes disposed in parallel with the plurality of fourth electrodes on the third surface of the second board;
a third board having a fourth surface facing the third surface; and
a plurality of sixth electrodes disposed on the fourth surface, each of the plurality of sixth electrodes intersecting with the plurality of fourth and the fifth electrodes,
wherein the dispersion liquid is interposed between the second and the third boards.

7. An electrophoresis display device, comprising:
a first board having a first surface;
a plurality of first electrodes disposed on the first surface;
a plurality of second electrodes disposed on the first surface in parallel with the plurality of first electrodes;
a second board having a second surface facing the first surface;
a plurality of third electrodes disposed at the second surface, each of the plurality of third electrodes intersecting with the plurality of the first electrodes and the plurality of the second electrodes at intersections;
a power source configured to apply a first voltage to at least one of said first electrodes, a second voltage to the plurality of second electrodes, and a third voltage to the plurality of third electrodes, wherein the first and third voltages each have one of at least three different values; and
a dispersion liquid disposed between the first and the second boards and including an insulating liquid and a plurality of electrophoresis particles of same electric polarity.

8. The electrophoresis display device according to claim 7, further comprising:
microcapsules interposed between the first and the second boards and holding the dispersion liquid.

9. The electrophoresis display device according to claim 8, further comprising:
projections disposed at a side of the microcapsules on the first or the second surface.

10. The electrophoresis display device according to claim 9, wherein the projections disposed on the first surface are the first and the second electrodes.

11. The electrophoresis display device according to claim 7, further comprising:
a plurality of fourth electrodes disposed at a third surface of the second board;
a plurality of fifth electrode disposed in parallel with the plurality of fourth electrodes each other at the third surface;
a third board having a fourth surface facing the third surface; and
a plurality of sixth electrodes disposed at the fourth surface, each of the plurality of sixth electrodes intersecting with the plurality of fourth electrodes and the plurality of fifth electrodes at intersections,
wherein the dispersion liquid is interposed between the second and the third boards.

12. An electrophoresis display device comprising:
a first board having a first surface;
a plurality of first electrodes disposed on the first surface;
a plurality of second electrodes disposed on the first surface in parallel with the plurality of first electrodes;
a second board having a second surface;
a plurality of third electrodes disposed on the second surface, each of the plurality of third electrodes intersecting with the first and the second electrodes at intersections;
a power source configured to apply a first voltage to at least one of said first electrodes, a second voltage to the plurality of second electrodes, and a third voltage to the plurality of third electrodes, wherein the first and third voltages each have one of at least three different values; and
microcapsules holding a dispersion liquid and disposed between the first and the second boards,
wherein the dispersion liquid includes an insulating liquid and a plurality of electrophoresis particles of same electric polarity.

13. The electrophoresis display device according to claim 12, further comprising:
projections disposed at a side of the microcapsule on the first surface or the second surface.

14. The electrophoresis display device according to claim 13, wherein the projections disposed on the first surface are the first and the second electrodes.

15. The electrophoresis display device according to claim 12, further comprising:
a plurality of fourth electrodes disposed at a third surface disposed on a side facing the second surface of the second board;
a plurality of fifth electrodes disposed in parallel with the plurality of fourth electrodes;
a third board having a fourth surface facing the third surface; and
a plurality of sixth electrodes disposed at the fourth surface, each of the plurality of sixth electrodes intersecting with the fourth and the fifth electrodes,
wherein the dispersion liquid is interposed between the second and the third boards.

16. An electrophoresis display device, comprising:
a plurality of cells two-dimensionally arranged and holding a dispersion liquid dispersed with an electrophoresis particles in an insulating liquid;
first and second boards sandwiching the plurality of cells;
a plurality of first electrodes each extending in a first direction and disposed near cell series of numbers of (2n+1: n is an integer of 0 or larger) and (2n+2) extending in the first direction; and a plurality of second electrodes, each extending in the first direction and disposed near cell series of numbers of (2n+2) and (2n+3);

a plurality of third electrodes disposed on the second board, each of the plurality of third electrodes extending in a second direction different from the first direction and intersecting the plurality of first electrodes and the plurality of second electrodes.

17. The electrophoresis display device according to claim 16, further comprising:

first, second and third voltage control units respectively coupled to the plurality of first, second and third electrodes, and configured to respectively adjust the voltages applied to each of the first, second and third electrodes in correspondence with a time band of an initializing electric field, a time band of a rewriting electric field and a time band of a hold state.

18. The electrophoresis display device according to claim 16, wherein the cells comprise microcapsules holding the dispersion liquid in a shell film.

19. The electrophoresis display device according to claim 18, wherein surfaces of the first and the second electrodes are projected to a side of the microcapsules relative to a surface of at least one of the first and second boards.

20. The electrophoresis display device, according to claim 16, wherein the first and the second directions form a right angle.

21. A method of controlling an electrophoresis display including a plurality of first electrodes disposed on a first surface, a plurality of second electrodes disposed on the first surface, a second surface facing the first surface, a plurality of third electrodes disposed on the second surface, each of the plurality of third electrodes intersecting with the plurality of first electrodes and the plurality of second electrodes, and a dispersion liquid disposed between the first and the second surfaces and including an insulating liquid and a plurality of electrophoresis particles charged to a same electrical polarity, said method comprising:

applying to the first electrode an initial voltage, a first hold voltage, and a rewriting voltage having a voltage value between the initial voltage and the first hold voltage, said first electrical potential supplying unit applying the initial, first hold and rewriting voltages in an order of the initial voltage, the rewriting voltage, and the first hold voltage;

applying to the second electrode an intermediary voltage having a voltage value between the initial voltage and the rewriting voyage; and applying to the third electrode a color display voltage having a voltage value different from the intermediary voltage, and a second hold voltage having a voltage value between the initial voltage and the rewriting voltage in synchronism with the first hold voltage.

22. The electrophoresis display device according to claim 7, wherein said power source comprises separate power units corresponding to said pluralities of said first, second and third electrodes.

23. The electrophoresis display device according to claim 7, wherein one of said at least three values is zero.

24. The electrophoresis display device according to claim 7, wherein two of said at least three values for said first voltage are different from two of said at least three values for said third voltage.

25. The electrophoresis display device according to claim 7, wherein said power source is configured to maintain said second voltage constant while said first and third voltages vary between said at least three different values.

26. The electrophoresis display device according to claim 25, wherein said second voltage is equal to one of said at least three values for said third voltage.

27. The electrophoresis display device according to claim 26, wherein said second voltage is between two of said at least three values for said third voltage.

28. The electrophoresis display device according to claim 27, wherein two of said at least three values of said first voltage are greater than said second voltage.

29. The electrophoresis display device according to claim 12, wherein said power source comprises separate power units corresponding to said pluralities of said first, second and third electrodes.

30. The electrophoresis display device according to claim 12, wherein one of said at least three values is zero.

31. The electrophoresis display device according to claim 12, wherein two of said at least three values for said first voltage are different from two of said at least three values for said third voltage.

32. The electrophoresis display device according to claim 12, wherein said power source is configured to maintain said second voltage constant while said first and third voltages vary between said at least three different values.

33. The electrophoresis display device according to claim 32, wherein said second voltage is equal to one of said at least three values for said third voltage.

34. The electrophoresis display device according to claim 33, wherein said second voltage is between two of said at least three values for said third voltage.

35. The electrophoresis display device according to claim 34, wherein two of said at least three values of said first voltage are greater than said second voltage.

* * * * *